United States Patent
Dharmarajan et al.

(10) Patent No.: US 11,053,381 B2
(45) Date of Patent: Jul. 6, 2021

(54) ELASTOMERIC PROPYLENE-ETHYLENE-DIENE TERPOLYMER COMPOSITIONS

(71) Applicant: ExxonMobil Chemical Patents Inc., Baytown, TX (US)

(72) Inventors: Narayanaswami Dharmarajan, Houston, TX (US); Ron Walker, Pearland, TX (US); Scott H. Loyd, League City, TX (US)

(73) Assignee: ExxonMobil Chemical Patents Inc., Baytown, TX (US)

( * ) Notice: Subject to any disclaimer, the term of this patent is extended or adjusted under 35 U.S.C. 154(b) by 133 days.

(21) Appl. No.: 16/499,684

(22) PCT Filed: Feb. 6, 2018

(86) PCT No.: PCT/US2018/016992
§ 371 (c)(1),
(2) Date: Sep. 30, 2019

(87) PCT Pub. No.: WO2018/190940
PCT Pub. Date: Oct. 18, 2018

(65) Prior Publication Data
US 2021/0102052 A1    Apr. 8, 2021

Related U.S. Application Data

(60) Provisional application No. 62/485,649, filed on Apr. 14, 2017.

(51) Int. Cl.
*C08L 23/16* (2006.01)
*F16G 1/06* (2006.01)
(Continued)

(52) U.S. Cl.
CPC ................ *C08L 23/16* (2013.01); *F16G 1/06* (2013.01); *C08F 4/76* (2013.01); *C08F 210/16* (2013.01);
(Continued)

(58) Field of Classification Search
None
See application file for complete search history.

(56) References Cited

U.S. PATENT DOCUMENTS

| 4,127,461 A | 11/1978 | Paulen |
| 5,571,868 A | 11/1996 | Datta et al. |

(Continued)

FOREIGN PATENT DOCUMENTS

| GB | 1 361 241 | 7/1974 |
| WO | 2019/112728 | 6/2019 |

OTHER PUBLICATIONS

Lanxess Buna EP Product Brochure, 2007. (Year: 2007).*
J.R. Beatty, Rubber Chemistry and Technology, 42, 1041 (1969).
G.R. Hamed, Rubber Chemistry and Technology, 54, 578 (1981).

*Primary Examiner* — Richard A Huhn

(57) ABSTRACT

In some embodiments, the present disclosure provides a composition comprising from 5 phr to 30 phr of a PEDM terpolymer having 1 to 10 wt % diene, 13 to 40 wt % ethylene, and 15 to 85 wt % propylene, based on the weight of the PEDM terpolymer. The composition further comprises from 70 phr to 95 phr of an ethylene-based copolymer comprising an ethylene content different than the first polymer, a $C_3$ to $C_{12}$ α-olefin, and, optionally, one or more dienes.

24 Claims, 10 Drawing Sheets

(51) Int. Cl.
*C08F 4/76* (2006.01)
*C08F 210/16* (2006.01)
*F16G 5/04* (2006.01)
*F16G 1/10* (2006.01)
*F16G 5/10* (2006.01)
*F16G 5/20* (2006.01)
*F16G 1/28* (2006.01)
*F16G 1/12* (2006.01)
*F16G 5/08* (2006.01)

(52) U.S. Cl.
CPC ...... *C08F 2420/10* (2021.01); *C08F 2800/20* (2013.01); *C08L 2205/025* (2013.01); *C08L 2314/06* (2013.01); *F16G 1/10* (2013.01); *F16G 1/12* (2013.01); *F16G 1/28* (2013.01); *F16G 5/04* (2013.01); *F16G 5/08* (2013.01); *F16G 5/10* (2013.01); *F16G 5/20* (2013.01)

(56) References Cited

U.S. PATENT DOCUMENTS

| | | |
|---|---|---|
| 5,654,370 A | 8/1997 | Datta et al. |
| 7,199,189 B2 | 4/2007 | Ravishankar et al. |
| 7,390,866 B2 | 6/2008 | Datta et al. |
| 7,605,217 B2 | 10/2009 | Datta et al. |
| 7,867,433 B2 | 1/2011 | Jacob et al. |
| 7,928,165 B2 | 4/2011 | Datta et al. |
| 8,013,093 B2 | 9/2011 | Datta et al. |
| 8,765,832 B2 | 7/2014 | Sunny et al. |
| 8,841,383 B2 | 9/2014 | Rodgers et al. |
| 2008/0188600 A1* | 8/2008 | Westwood ............... C08L 23/16 524/275 |
| 2008/0287620 A1 | 11/2008 | Ravishankar et al. |
| 2009/0115108 A1 | 5/2009 | Rodgers et al. |
| 2010/0240809 A1 | 9/2010 | Yamada |
| 2013/0050488 A1 | 2/2013 | Brouard et al. |
| 2015/0368450 A1* | 12/2015 | Sato .................... C08L 23/0815 198/846 |
| 2017/0233513 A1 | 8/2017 | Tsou et al. |
| 2017/0292013 A1 | 10/2017 | Blok et al. |
| 2017/0362350 A1 | 12/2017 | Canich et al. |

* cited by examiner

ELASTOMERIC PROPYLENE-ETHYLENE-DIENE TERPOLYMER COMPOSITIONS

PRIORITY CLAIM

This application claims priority to and benefit of U.S. Patent Application Ser. No. 62/485,649, filed Apr. 14, 2017, which is incorporated by reference in its entirety.

FIELD

The present disclosure relates to polymer compositions comprising propylene-α-olefin-diene terpolymers, for instance propylene-ethylene-diene (PEDM) terpolymers, and transmission belts and other articles comprising such terpolymers.

BACKGROUND

Power transmission belts include V-belts, flat belts, toothed or synchronous belts and multi-ribbed belts. Belt construction typically includes an elastomeric belt body, spiraled or helically wound tension cord or other textile tensile member embedded in the belt body, and often other textile reinforcements embedded in the belt body or covering one or more of the belt surfaces.

The elastomeric belt body may include one or more vulcanized rubber compositions, or an elastomeric composition, such as a thermoplastic elastomer composition. Elastomer compositions used have included ethylene-propylene-(optional diene) polymers, known as EP(D)M polymers or EP(D)M rubbers. Elastomeric compositions based on EP(D)M polymers need to possess the right combination of processability and physical properties both in the vulcanized and unvulcanized state to satisfy manufacturing and end use application requirements.

Two noteworthy properties currently lacking in vulcanized EP(D)M compositions for use of the compositions for transmission belt applications are balance of tack and green strength. Tack is the maximum force required to separate two identical composition samples (e.g., rubber specimens), while green strength is the tensile modulus measured at 25% or higher extension of a composition sample (e.g., a rubber specimen).

From a manufacturing standpoint, for unvulcanized EP(D)M compositions, the uncured elastomeric sheets coming off the calender roll should possess adequate tack to permit splicing of individual sheets to form a sheet that is several times larger than the calendered sheet in width. The unvulcanized elastomer should also have adequate green strength to be rolled onto a mandrel without sagging. EP(D)M polymers have insufficient tack and green strength for use as (and manufacture of) transmission belts.

Tack and green strength are influenced by polymer crystallinity. Lower crystallinity leads to greater tack. For example, tack of an EP(D)M composition can be modified by lowering the ethylene content of the EP(D)M polymer and thereby reducing crystallinity. However, lower crystallinity reduces green strength. Furthermore, lower crystallinity is detrimental to properties such as abrasion resistance, which is also an important property for transmission belts. Indeed, design of a single polymer (or polymer composition) that has these contrasting polymer features to meet the tack and green strength requirements is a synthetic challenge.

Hydrocarbon tackifiers have been used as additives in EP(D)M compositions to enhance tack. However, non-hydrogenated tackifiers co-vulcanize with the EP(D)M but do not display long-term heat resistance because of their unsaturation. Hydrogenated tackifiers show better thermal stability; however, they are more expensive. Moreover, tackifying resins directionally increase EP(D)M compound costs, when incorporated as an additive without replacing the EP(D)M polymer component.

Some potentially relevant background references include: WIPO Publication Nos. WO 2016/053541, WO 2016/053542, WO 2016/114914; U.S. Pat. Nos. 5,654,370; 5,571,868; 7,199,189; 7,390,866; 7,605,217; 7,867,433; 7,928,165; 8,013,093; 8,765,832; and 8,841,383; U.S. Patent Publication No. 2013/050488; as well as J. R. Beatty, *Rubber Chem. & Tech.*, 42, 1041 (1969) and G. R. Hamed, *Rubber Chem. & Tech.*, 54, 578 (1981).

There is a need for polymers and polymer compositions having adequate tack and green strength for use in transmission belts.

SUMMARY

Embodiments of the present disclosure include compositions comprising a minor amount (e.g., from 5 phr to 30 phr of such composition) of a first polymer that is a propylene-α-olefin-diene terpolymer, such as a propylene-ethylene-diene terpolymer (such terpolymers may be referred to herein by the shorthand "PEDM" even though other α-olefins instead of or in addition to ethylene are contemplated as comonomers with the propylene and diene, and, similarly, other polyenes may be utilized instead of or in addition to dienes, except where specifically noted otherwise). The compositions of various embodiments further include a major amount (e.g., from 70 phr to 95 phr of the composition) of a second polymer that is an ethylene-based copolymer, such as an ethylene-α-olefin and optional diene copolymer (e.g., an EP(D)M polymer, or an ethylene-butene-optional-diene (EB(D)M polymer). It has been discovered that compositions of the present disclosure provide improved tack and/or green strength. The improved tack and/or green strength make the compositions ideal for use in, e.g., transmission belts, and in particular to provide improved properties and/or superior manufacturing processes for transmission belts.

In some embodiments, the present disclosure provides a composition that comprises from 5 phr to 30 phr of a PEDM terpolymer having 1 wt % to 10 wt % polyene (e.g., diene, and in particular non-conjugated diene), 13 wt % to 40 wt % α-olefin (e.g., ethylene), and 15 wt % to 85 wt % propylene, based on the weight of the PEDM terpolymer. The composition further comprises from 70 phr to 95 phr of an ethylene-based copolymer comprising: an ethylene content different than α-olefin content of the first polymer; a $C_3$ to $C_{12}$ α-olefin; and, optionally, one or more polyenes (preferably one or more dienes).

In other embodiments, the present disclosure provides a composition comprising from 5 phr to 30 phr of a first polymer formed by polymerizing propylene, ethylene, and a diene in the presence of a bridged fluorenyl-cyclopentadienyl group 4 catalyst that has been activated by an activator. The catalyst is represented by Formula (I):

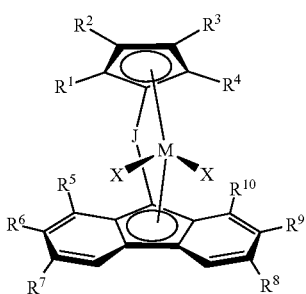

(I)

J is a divalent bridging group. M is a group 4 transition metal. Each X is independently a univalent anionic ligand, or two Xs are joined together to form a metallocycle ring with M, or two Xs are joined to form a chelating ligand, a diene ligand, or an alkylidene ligand. Each $R^1$, $R^2$, $R^3$, $R^4$, $R^5$, $R^6$, $R^7$, $R^8$, $R^9$, and $R^{10}$ is independently hydrogen, $C_1$-$C_{50}$ substituted or unsubstituted alkyl, provided that any one or more of the pairs $R^1$ and $R^2$, $R^3$ and $R^4$, $R^5$ and $R^6$, $R^6$ and $R^7$, $R^8$ and $R^9$, and $R^9$ and $R^{10}$, may optionally be bonded together to form a saturated or partially saturated cyclic or fused ring structure. The activator is a non-coordinating anion activator. The composition further comprises from 75 phr to 95 phr of an ethylene-based copolymer.

DETAILED DESCRIPTION

Figure 1:
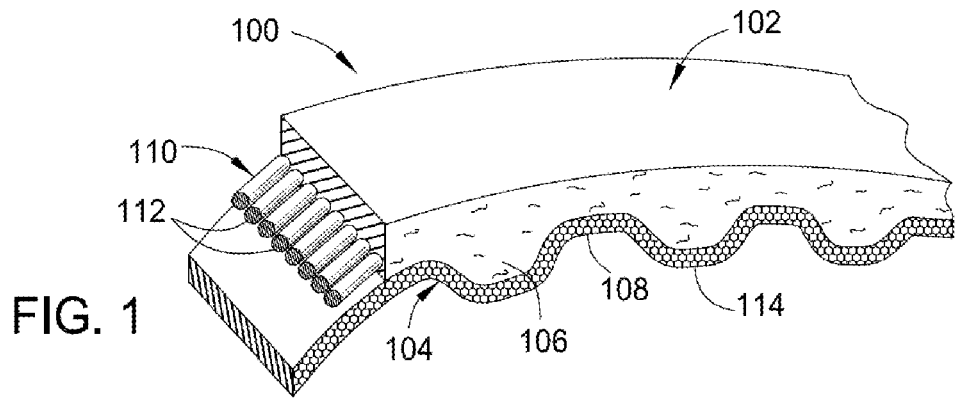
FIG. 1 is a fragmented perspective view of a transmission belt in accordance with some embodiments of the present disclosure.

Embodiments of the present disclosure include compositions comprising a minor amount (e.g., from 5 phr to 30 phr of a composition) of a first polymer that is a PEDM terpolymer and a major amount (e.g., from 70 phr to 95 phr of a composition) of a second polymer that is an ethylene-based copolymer. It has been discovered that compositions of the present disclosure provide improved tack and/or green strength for use in transmission belts. These improved properties provide transmission belts having improved properties for better use and improved manufacturing of the transmission belts.

Definitions

As used herein, the term "copolymer" is meant to include polymers having two or more monomers. The term "polymer" as used herein includes, but is not limited to, homopolymers, copolymers, terpolymers, etc., and alloys and blends thereof. The term "polymer" as used herein also includes impact, block, graft, random, and alternating copolymers. The term "polymer" shall further include all possible geometrical configurations unless otherwise specifically stated. Such configurations may include isotactic, syndiotactic and random (i.e., atactic) symmetries.

The term "blend" as used herein refers to a mixture of two or more polymers.

The term "monomer" or "comonomer," as used herein, can refer to the monomer used to form the polymer, i.e., the unreacted chemical compound in the form prior to polymerization, and can also refer to the monomer after it has been incorporated into the polymer, also referred to herein as a "[monomer]-derived unit". Different monomers are discussed herein, including propylene monomers, ethylene monomers, and diene monomers.

As used herein, the term "ethylene-based copolymer," includes copolymers derived from ethylene, an α-olefin having 3 or more carbon atoms, such as 3-12 carbon atoms, such as 6-10 carbon atoms, and optionally a diene. In preferred embodiments, the ethylene-based copolymer is an ethylene-propylene copolymer or ethylene-propylene-diene polymer.

As used herein, an "ethylene-propylene-diene polymer" (EP(D)M) is defined to be a copolymer having an ethylene content (derived from ethylene monomers) and a propylene content (derived from propylene monomers), and optionally a diene content (derived from diene monomers, preferably non-conjugated diene monomers), where the ethylene content is from 40 wt % to 95 wt % (such as 41 wt % to 95 wt %, such as 45 wt % to 90 wt %, such as 50 wt % to 80 wt %), the diene content is 0 wt % to 15 wt %, and the balance (i.e., the remaining wt % of the polymer) is primarily (e.g., allowing for minor impurities) or entirely propylene content, based on the weight of the polymer. An EP(D)M may have a Mooney viscosity, (ML, 1+4 @ 125° C.) (measured according to ASTM D1646) of 15 to 100. The terms "EP(D)M" and "EPDM" are used interchangeably and have the same meaning, unless specified otherwise in context (e.g., where the polymer is referred to as definitively comprising diene monomer(s)).

The term "propylene-α-olefin-diene terpolymer" as used herein includes a polymer derived from propylene, an α-olefin (preferably ethylene), and diene monomers. As noted previously, propylene-α-olefin-diene terpolymers may be referred to by the shorthand PEDM, even though α-olefins instead of or in addition to ethylene are contemplated as comonomers in such terpolymers, and/or polyenes instead of or in addition to dienes are contemplated. Preferably, the PEDM terpolymer comprises a propylene content (derived from propylene monomers), an ethylene content (derived from ethylene monomers) and a diene content (derived from diene monomers). PEDMs have an ethylene content from 8 wt % to 45 wt % based on the weight of the polymer, such as from 12 wt % to 40 wt %.

As used herein, "phr" means parts per hundred parts rubber, where the "rubber" is the total rubber content of the composition. Herein, both PEDM and ethylene-based copolymer (e.g., EP(D)M) are considered to contribute to the total rubber content, such that in compositions where both are present, the "total rubber" is the combined weight of PEDM and ethylene-based copolymer. Thus, for example, a composition having 30 parts by weight of PEDM and 70 parts by weight of ethylene-based copolymer may be referred to as having 30 phr PEDM and 70 phr ethylene-based copolymer. Other components added to the composition are calculated on a phr basis—that is, addition of 50 phr of oil means, e.g., that 50 g of oil are present in the composition for every 100 g of PEDM and ethylene-based copolymer combined. Unless specified otherwise, phr should be taken as phr on a weight basis.

As used herein, "tensile strength" means the amount of stress applied to a sample to break the sample. It can be expressed in Pascals or pounds per square inch (PSI). ASTM D412-16 can be used to determine tensile strength of a polymer.

"Mooney viscosity" as used herein is the Mooney viscosity of a polymer or polymer composition. The polymer composition analyzed for determining Mooney viscosity should be substantially devoid of solvent. For instance, the sample may be placed on a boiling-water steam table in a hood to evaporate a large fraction of the solvent and unreacted monomers, and then, dried in a vacuum oven overnight (12 hours, 90° C.) prior to testing, in accordance with laboratory analysis techniques, or the sample for testing may be taken from a devolatilized polymer (i.e., the polymer post-devolatilization in industrial-scale processes). Unless otherwise indicated, Mooney viscosity is measured using a Mooney viscometer according to ASTM D-1646, but with the following modifications/clarifications of that procedure. First, sample polymer is pressed between two hot plates of a compression press prior to testing. The plate temperature is 125° C.+/−10° C. instead of the 50+/−5° C. recommended in ASTM D-1646, because 50° C. is unable to cause sufficient massing. Further, although ASTM D-1646 allows for several options for die protection, should any two options provide conflicting results, PET 36 micron should be used as the die protection. Further, ASTM D-1646 does not indicate a sample weight in Section 8; thus, to the extent results may vary based upon sample weight, Mooney viscosity determined using a sample weight of 21.5+/−2.7 g in the ASTM D-1646 Section 8 procedures will govern. Finally, the rest procedures before testing set forth in D1646 Section 8 are 23+/−3° C. for 30 min in air; Mooney values as reported herein were determined after resting at 24+/−3° C. for 30 min in air. Samples are placed on either side of a rotor according to the ASTM D-1646 test method; torque required to turn the viscometer motor at 2 rpm is measured by a transducer for determining the Mooney viscosity. The results are reported as Mooney Units (ML, 1+4 @ 125° C.), where M is the Mooney viscosity number, L denotes large rotor (defined as ML in ASTM D1646-99), 1 is the pre-heat time in minutes, 4 is the sample run time in minutes after the motor starts, and 125° C. is the test temperature. Thus, a Mooney viscosity of 90 determined by the aforementioned method would be reported as a Mooney viscosity of 90 MU (ML, 1+4 @ 125° C.). Alternatively, the Mooney viscosity may be reported as 90 MU; in such instance, it should be assumed that the just-described method is used to determine such viscosity, unless otherwise noted. In some instances, a lower test temperature may be used (e.g., 100° C.), in which case Mooney is reported as Mooney Viscosity (ML, 1+4 @ 100° C.), or @ T° C. where T is the test temperature.

Numerical ranges used herein include the numbers recited in the range. For example, the numerical range "from 1 wt % to 10 wt %" includes 1 wt % and 10 wt % within the recited range.

Compositions

Compositions of the present disclosure comprise a minor amount (e.g., from 5 phr to 30 phr of a composition) of a first polymer that is a random PEDM terpolymer and a major amount (e.g., from 70 phr to 95 phr of a composition) of a second polymer that is a random ethylene-based copolymer. Compositions of the present disclosure can comprise the first polymer that is a PEDM terpolymer in an amount of from 1 phr to 50 phr, such as from 2 phr to 40 phr, such as from 3 phr to 30 phr, such as from 4 phr to 20 phr, such as from 5 phr to 18 phr, such as from 5 phr to 30 phr, such as from 5 phr to 10 phr, based on the total amount of polymer content of the composition.

First Polymers: PEDM Terpolymers

PEDM terpolymers of the present disclosure have from 1 to 10 wt % polyene (preferably diene) content, 15 to 40 wt % $C_2$ or $C_4$ to $C_{12}$ α-olefin (preferably ethylene) content, and 15 to 85 wt % propylene content, said wt %s based on the weight of the PEDM terpolymer.

PEDM terpolymers of the present disclosure can have a heat of fusion $H_f$ of less than 1 J/g. In at least one embodiment, PEDM terpolymers are amorphous. Additionally or alternatively, PEDM terpolymers can have atactic propylene sequences. In at least one embodiment, a PEDM terpolymer has a glass transition temperature (Tg) from −40° C. to −2° C., such as from −35° C. to −30° C.

PEDM terpolymers of the present disclosure comprise from 8 wt % to 40 wt % $C_2$ or $C_4$ to $C_{12}$ α-olefin comonomer (preferably ethylene), based on the weight of the PEDM terpolymer. Other preferred ranges of α-olefin (such as ethylene) content include from 12 wt % to 40 wt %, such as from 25 wt % to 40 wt %, such as from 27 wt % to 40 wt %, such as from 30 wt % to 40 wt %, such as from 30 wt % to 38 wt %, such as from 30 wt % to 34 wt %, such as from 32 wt % to 38 wt %, such as from 34 wt % to 38 wt %, for example about 35 wt %, based on the weight of the PEDM terpolymer. In yet other embodiments, the α-olefin (preferably ethylene) content may be within the lower range from 12 to 30 wt %, such as from 13 to 25 wt % or even 13 to 20 wt %, based on the weight of the PEDM terpolymers.

The polyenes, as noted, are preferably (but not necessarily) dienes. Suitable dienes may be conjugated or non-conjugated. Preferably, the dienes are non-conjugated. Dienes include 5-ethylidene-2-norbornene (ENB); 1,4-hexadiene; 5-methylene-2-norbornene (MNB); 1,6-octadiene; 5-methyl-1,4-hexadiene; 3,7-dimethyl-1,6-octadiene; 1,3-cyclopentadiene; 1,4-cyclohexadiene; vinyl norbornene (VNB); dicyclopendadiene (DCPD); and combinations thereof. Preferably, the diene is ENB or VNB.

Preferably, a PEDM terpolymer comprises a diene content of from 0.2 wt % to 10 wt %, such as from 0.5 wt % to 8 wt %, such as from 0.8 wt % to 6 wt %, such as from 1 wt % to 5 wt %, such as from 2 wt % to 4 wt %, for example about 3 wt %, based on the weight of the terpolymer. Other preferred ranges may include from 0.2 wt % to 5 wt %, such as from 0.2 wt % to 4 wt %, such as from 0.2 wt % to 3.5 wt %, such as from 0.2 wt % to 3.0 wt %, such as from 0.2 wt % to 2.5 wt %, based on the weight of the polymer. In at least one embodiment, the diene is 5-ethylidene-2-norbornene content in an amount of from 0.5 wt % to 10 wt %, such as from 0.5 wt % to 4 wt %, such as from 1 wt % to 3.5 wt %, such as from 0.5 wt % to 3.0 wt %, for example about 3 wt % based on the weight of the polymer.

PEDM terpolymers of the present disclosure may have a weight average molecular weight (Mw) of 5,000,000 or less, a number average molecular weight (Mn) of 3,000,000 or less, a z-average molecular weight (Mz) of 10,000,000 or less.

Molecular weights (number average molecular weight (Mn), weight average molecular weight (Mw), and z-average molecular weight (Mz)) were determined using a Polymer Laboratories Model 220 high temperature gel-permeation chromatography size-exclusion chromatography (GPC-SEC) equipped with on-line differential refractive index (DRI), light scattering (LS), and viscometer (VIS) detectors. Three Polymer Laboratories PLgel 10 m Mixed-B columns were used for separation using a flow rate of 0.54 ml/min and a nominal injection volume of 300 μL. The detectors and columns were contained in an oven maintained at 135° C. The stream emerging from the SEC columns was directed into the miniDAWN (Wyatt Technology, Inc.) optical flow cell and then into the DRI detector. The viscometer was inside the SEC oven, positioned after the DRI detector. The details of these detectors as well as their calibrations have been described by, for example, T. Sun, P. Brant, R. R. Chance, and W. W. Graessley, *Macromolecules*, vol. 34(19), pp. 6812-6820, (2001).

Solvent for the SEC experiment was prepared by dissolving 6 grams of butylated hydroxy toluene (BHT) as an antioxidant in 4 liters of Aldrich reagent grade 1, 2, 4-trichlorobenzene (TCB). The TCB mixture was then filtered through a 0.7 micrometer glass pre-filter and subsequently through a 0.1 micrometer Teflon filter. The TCB was then degassed with an online degasser before entering the SEC. Polymer solutions were prepared by placing dry polymer in a glass container, adding the desired amount of BHT stabilized TCB, then heating the mixture at 160° C. with continuous agitation for about 2 hours. All quantities were measured gravimetrically. The TCB densities used to express the polymer concentration in mass/volume units are 1.463 g/mL at 22° C. and 1.324 g/mL at 135° C. The injection concentration was from 1.0 to 2.0 mg/mL, with lower concentrations being used for higher molecular weight samples. Prior to running each sample the DRI detector and the injector were purged. Flow rate in the apparatus was then increased to 0.5 mL/minute, and the DRI is allowed to stabilize for 8 to 9 hours before injecting the first sample. The concentration, c, at each point in the chromatogram is calculated from the baseline-subtracted DRI signal, $I_{DRI}$, using the following equation:

$$c = K_{DRI} I_{DRI}/(dn/dc)$$

where $K_{DRI}$ is a constant determined by calibrating the DRI with a series of mono-dispersed polystyrene standards with molecular weight ranging from 600 to 10M, and (dn/dc) is the refractive index increment for the system. The refractive index, n=1.500 for TCB at 145° C. and λ=690 nm. For purposes of this invention and the claims thereto (dn/dc)=0.1048 for ethylene-propylene copolymers, and (dn/dc)=0.01048−0.0016ENB for EPDM comprising ENB as the diene, where ENB is the ENB content in wt % in the ethylene-propylene-diene terpolymer. Where other non-conjugated polyenes are used instead of (or in addition to) ENB, the ENB is taken as weight percent of total non-conjugated polyenes. The value (dn/dc) is otherwise taken as 0.1 for other polymers and copolymers, including PEDM terpolymers. Units of parameters used throughout this description of the SEC method are: concentration is expressed in $g/cm^3$, molecular weight is expressed in g/mol, and intrinsic viscosity is expressed in dL/g.

The light scattering (LS) detector was a high temperature miniDAWN (Wyatt Technology, Inc.). The primary components are an optical flow cell, a 30 mW, 690 nm laser diode light source, and an array of three photodiodes placed at collection angles of 45°, 90°, and 135°. The molecular weight, M, at each point in the chromatogram was determined by analyzing the LS output using the Zimm model for static light scattering (M. B. Huglin, LIGHT SCATTERING FROM POLYMER SOLUTIONS, Academic Press, 1971):

$$\frac{K_o c}{\Delta R(\theta)} = \frac{1}{MP(\theta)} + 2A_2 c$$

Here, $\Delta R(\theta)$ is the measured excess Rayleigh scattering intensity at scattering angle θ, c is the polymer concentration determined from the DRI analysis, $A_2$ is the second virial coefficient (for purposes of this invention, $A_2=0.0015$ for ethylene homopolymer and $A_2=0.0015-0.00001$ EE for ethylene-propylene copolymers, where EE is the ethylene content in weight percent in the ethylene-propylene copolymer. $P(\theta)$ is the form factor for a mono-disperse random coil, and $K_o$ is the optical constant for the system:

$$K_o = \frac{4\pi^2 n^2 (dn/dc)^2}{\lambda^4 N_A}$$

where $N_A$ is Avogadro's number, and $(dn/dc)$ is the refractive index increment for the system. The refractive index, n=1.500 for TCB at 145° C. and λ=690 nm.

PEDM terpolymers of the present disclosure may have an Mw of from 5,000 g/mol to 5,000,000 g/mol, such as from 10,000 g/mol to 1,000,000 g/mol, such as from 20,000 g/mol to 500,000 g/mol, such as from 50,000 g/mol to 400,000 g/mol. The PEDM terpolymer may have an Mn of 2,500 g/mol to 2,500,000 g/mol, such as from 5,000 g/mol to 500,000 g/mol, such as from 10,000 g/mol to 250,000 g/mol, such as from 25,000 g/mol to 200,000 g/mol. The PEDM terpolymer may have an Mz of 10,000 g/mol to 7,000,000 g/mol, such as from 50,000 g/mol to 1,000,000 g/mol, such as from 80,000 g/mol to 700,000 g/mol, such as from 100,000 g/mol to 500,000 g/mol. For purposes of this application, where DRI and LS measurements conflict, LS measurements should be used for Mw and Mz, while DRI measurements should be used for Mn.

The molecular weight distribution index (MWD=(Mw/Mn)) of PEDM terpolymers of the present disclosure may be from 1.5 to 40. For example, a PEDM terpolymer may have an MWD from 1.5 to 40, such as from 1.8 to 20, such as from 2.0 to 10, such as from 2.0 to 5, such as from 3 to 4.5. In one or more embodiments, the MWD of a PEDM terpolymer is 1.8 to 5, such as from 1.8 to 3. Further, although MWD (polydispersity) is taken as Mw/Mn, where DRI and LS measurements conflict, MWD should be determined as Mw (measured by LS)/Mn (measured by DRI), or $Mw_{LS}/Mn_{DRI}$.

PEDM terpolymers of the present disclosure may have a density of from 0.85 g/cm$^3$ to 0.92 g/cm$^3$, or from 0.87 g/cm$^3$ to 0.90 g/cm$^3$, or from 0.88 g/cm$^3$ to 0.89 g/cm$^3$, at room temperature as measured per the ASTM D-1505 test method.

PEDM terpolymers of the present disclosure may have a melt flow rate (MFR, 2.16 kg weight at 230° C.), equal to or greater than 0.2 g/10 min as measured according to the ASTM D-1238. In at least one aspect, the MFR (2.16 kg at 230° C.) is from 0.5 g/10 min to 200 g/10 min, such as from 1 g/10 min to 100 g/10 min, such as from 2 g/10 min to 30 g/10 min, such as from 5 g/10 min to 30 g/10 min, such as from 10 g/10 min to 30 g/10 min, such as from 10 g/10 min to 25 g/10 min. In at least one aspect, MFR (2.16 kg at 230° C.) is about 7.5 g/10 min.

PEDM terpolymers of the present disclosure may have a Mooney viscosity (ML, 1+4 @ 125° C.) of less than 100, such as less than 75, such as less than 60, such as less than 30, such as less than 20, such as less than 15, for example about 14 MU. For instance, in PEDM according to some embodiments, Mooney viscosity may be within the range from 5, 10, or 12 MU to 20, 25, or 30 MU.

PEDM terpolymers of the present disclosure preferably have atactic polypropylene sequences. Also or instead, they are preferably amorphous, meaning they will exhibit no melting peak when subjected to differential scanning calorimetry (DSC) testing. Alternatively, PEDM according to some embodiments may exhibit minor melting peak, such that they may be observed to have Hf<1 J/g according to the DSC methodology described herein. Further, where a PEDM exhibits any melting peak, such peak may be a single peak, or the PEDM may show secondary melting peaks adjacent to the principal peak. For purposes herein, such secondary melting peaks are considered together as a single melting point, with the highest of these peaks (relative to baseline as described herein) being considered as the melting point of the PEDM terpolymer.

According to yet further embodiments, the crystallinity of PEDM terpolymers may be expressed in terms of percentage of crystallinity (i.e., % crystallinity), as determined according to the DSC procedure described herein. Although PEDM according to certain embodiments is amorphous (and may therefore be said to have 0% crystallinity), if a PEDM according to various other embodiments exhibits any crystallinity, it preferably has a % crystallinity of from 0.1% to 5%, preferably 0.1% to 3%. (The degree of crystallinity is determined by dividing (i) heat of fusion measured by (ii) the heat of fusion for 100% crystalline polyethylene, which has the value of 293 J/g (B. Wunderlich, Thermal Analysis, Academic Press, 1990, pp. 417-431).)

The DSC procedures for determining melting point (™) and/or heat of fusion (Hf) (or lack thereof) of the PEDM terpolymer include the following. The polymer is pressed at a temperature of from 200° C. to 230° C. in a heated press, and the resulting polymer sheet is hung, under ambient conditions (of 20-23.5° C.), in the air to cool. 6 to 10 mg of the polymer sheet is removed with a punch die. This 6 to 10 mg sample is annealed at room temperature (22° C.) for 80 to 100 hours. At the end of this period, the sample is placed in a DSC (Perkin Elmer Pyris One Thermal Analysis System) and cooled at a rate of about 10° C./min to −30° C. to −50° C. and held for 10 minutes at −50° C. The sample is heated at 10° C./min to attain a final temperature of 200° C. The sample is kept at 200° C. for 5 minutes. Then a second cool-heat cycle is performed, using the same conditions described above. Events from both cycles, "first melt" and "second melt", respectively, are recorded. The thermal output is recorded as the area under the melting peak of the sample, which typically occurs between 0° C. and 200° C. It is measured in Joules and is a measure of the $H_f$ of the polymer. Reference to melting point temperature and Hf herein refers to the first melt.

Further, as mentioned above, where the sample exhibits no melting peak, as in the case of amorphous polymers, it may be said to have no Hf. However, even some amorphous or near-amorphous PEDM samples might exhibit a minor melting peak, e.g., such that Hf on the first melt may be observed as <1 J/g. Therefore, for purposes of the present application, a PEDM may be considered amorphous when it has Hf<1 J/g, or alternatively when it exhibits no discernable melting peak, both observations being taken from a first melt in the above-described DSC procedure.

PEDM terpolymers of some embodiments can have a glass transition temperature (Tg), as determined by the DSC procedure described herein, from −45° C. to −2° C., such as from −40° C. to −25° C., −40° C. to −20° C., −35° C. to −25° C., −40° C. to −15° C., or −35° C. to −15° C.; or alternatively from −20° C. to −2° C., such as from −15° C. to −2° C., such as from −10° C. to −2° C., such as from −5° C. to −2° C.

Catalyst Systems:

PEDM terpolymers of the present disclosure can be synthesized using a catalyst system comprising at least one catalyst and at least one activator.

Catalysts: PEDM terpolymers of the present disclosure can be synthesized using any suitable metallocene catalyst system, although it is preferred that the catalyst system be such that the PEDM terpolymers has atactic polypropylene sequences and/or little or no crystallinity. Suitable metallocene catalyst systems include a catalyst that is a bridged fluorenyl-cyclopentadienyl group 4 catalyst (and/or Cp-fluorenyl variants), mono-Cp amido group 4 catalyst (and/or mono-Cp amido variants), biphenyl phenol (BPP) transition metal catalyst, pyridyl amide transition metal catalyst and/or pyridyl diamide transition metal catalyst.

Particularly preferred metallocene catalysts according to some embodiments include fluorenyl-cyclopentadienyl group 4 catalysts represented by formula (I):

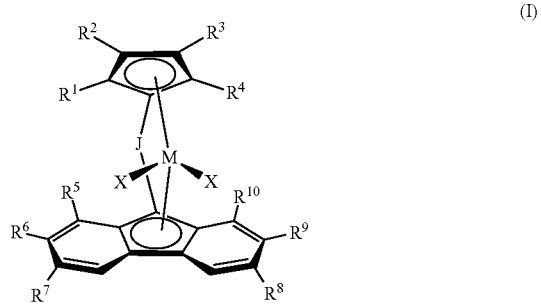

where: J is a divalent bridging group (preferably comprising C, Si, or both);

M is a group 4 transition metal (with Hf being preferred in certain embodiments);

each X is independently a univalent anionic ligand, or two Xs are joined together to form a metallocycle ring with M, or two Xs are joined to form a chelating ligand, a diene ligand, or an alkylidene ligand; and each $R^1$, $R^2$, $R^3$, $R^4$, $R^5$, $R^6$, $R^7$, $R^8$, $R^9$, and $R^{10}$ is independently hydrogen, $C_1$ to $C_{50}$ substituted or unsubstituted alkyl (preferably unsubstituted $C_1$ to $C_{10}$ alkyl, more preferably $C_1$ to $C_5$ alkyl), provided that any one or more of the pairs $R^1$ and $R^2$, $R^3$ and $R^4$, $R^5$ and $R^6$, $R^6$ and $R^7$, $R^8$ and $R^9$, and $R^9$ and $R^{10}$, may optionally be bonded together to form a saturated or partially saturated cyclic or fused ring structure. Both the activated and un-activated (precursor) forms of the compound represented by formula (I) are embraced by formula (I).

In at least one embodiment, J is a bridging group comprising carbon and/or silicon atoms, such as dialkylsilyl; preferably J is selected from —$CH_2$—, —$CH_2CH_2$—, —$C(CH_3)_2$—, —$Si(Me_2$-, —$SiEt_2$-, —$Siph_2$-, —$Si(Me)(V_6H_5)$—, —$C(Ph)_2$-, —$C(p-(Et)_3SiPh)_2$-, —$C(Si(Et)_3)_2$-, $(CH_2)_3Si$=, $(CH_2)_4Si$=, and $(CH_2)_5Si$=, where Me is methyl, Et is ethyl, and Ph is phenyl, and further where each $(CH_2)_xSi$= indicates a cyclic silylene moiety having x carbons and the silicon atom in the cyclic group, e.g., where x is 4 in such compounds, J is cyclotetramethylenesilylene.

In at least one embodiment, $R^6$ and $R^9$ are each $C_1$ to $C_4$ alkyl, preferably $C_4$ alkyl such as tert-butyl; $R^1$-$R^4$, $R^5$, $R^7$, $R^8$, and $R^{10}$ are each independently methyl, ethyl, or H (preferably, each is H); J is selected from any of the groups described above (preferably J is (p-$(Et)_3SiPh)_2C$); M is Hf; and each X is independently $C_1$ to $C_3$ alkyl or a halide (preferably each X is methyl).

A particularly preferred fluorenyl-cyclopentadienyl group 4 catalyst according to some embodiments is 1,1'-bis(4-triethylsilylphenyl)methylene-(cyclopentadienyl)(2,7-di-tertiary-butyl-fluoren-9-yl)hafnium dimethyl.

Activators: The terms "cocatalyst" and "activator" can be used interchangeably and include any compound which can activate any one of the catalyst compounds described above (including either or both of the first and second metallocene catalyst compounds) by converting the neutral catalyst compound ("un-activated") to a catalytically active catalyst compound cation ("activated"). Suitable activators are described in Paragraphs [0110] to [0115] of WIPO Publication No. WO 2016/114914 A1, which description is herein incorporated by reference; and/or in Paragraphs [0110] to [0133] of U.S. Patent Publication No. 2015/0025209, which description is incorporated by reference herein.

Particularly useful activators in some embodiments of the present disclosure include non-coordinating anion (NCA) activators, such as those in Paragraph [0124] of U.S. Patent Publication No. 2015/0025209, and also those in Columns 7 and 20–21 in U.S. Pat. No. 8,658,556, which description is incorporated by reference. Particular examples of suitable NCA activators include: N,N-dimethylanilinium tetrakis (pentafluorophenyl)borate, N,N-dimethylanilinium tetrakis (perfluoronaphthyl)borate, N,N-dimethylanilinium tetrakis (perfluorobiphenyl)borate, triphenylcarbenium tetrakis(perfluoronaphthyl)borate, bis($C_4$-$C_{20}$alkyl)methylammonium tetrakis (perfluoronaphthyl)borate, $Me_3NH^+$ tetrakis(pentafluorophenyl)borate, $Me_3NH^+$ tetrakis(heptafluoro-2-naphthyl)borate, and bis(hydrogenated tallowalkyl)methylammonium tetrakis(pentafluorophenyl)borate. A particularly preferable NCA activator is N,N-dimethylanilinium tetrakis(pentafluorophenyl)borate.

A catalyst of the present disclosure can be activated on-line in the catalyst feed line or in the polymerization reactor. Furthermore, an activator-to-catalyst molar ratio is from 0.1:1 to 1000:1, such as from 0.5:1 to 100:1, such as 2:1 to 50:1. A preferred molar ratio is 1:1.

In some embodiments, the activator(s) is/are contacted with a catalyst compound to form the catalyst system comprising activated catalyst and activator and/or other charge-balancing moiety, before the catalyst system is contacted with one or more monomers to form an PEDM terpolymer. In other embodiments, the activator may be co-fed together with one or more monomers into a reactor having catalyst in the reactor. Preferably, the catalyst is contacted with the activator before being fed into the polymerization reaction zone of a reactor.

Second Polymers

Compositions of the present disclosure comprise a second polymer different than the PEDM terpolymer described above. The second polymer is preferably an ethylene-based copolymer. In at least one embodiment, a composition comprises a blend of the PEDM terpolymer and one or more ethylene-based copolymer(s).

Compositions of the present disclosure may comprise one or more second polymers (ethylene-based copolymers) in an amount from about 50 phr to about 99 phr, such as from about 60 phr to about 99 phr, such as from about 70 phr to about 98 phr, such as from about 70 phr to about 95 phr, such as from about 75 phr to about 95 phr, such as from about 85 phr to about 95 phr, where the basis of 100 parts rubber is taken as the combined weight of first polymer (e.g., PEDM) and second polymer (e.g., ethylene-based copolymer) in the composition.

Ethylene-based copolymers of the present disclosure comprise an ethylene content different than the ethylene content of the first polymer. In at least one embodiment, an ethylene-based copolymer has at least 40 wt % ethylene content, preferably at least 50, 55, 60, 65, 70 or 75 wt % ethylene content, and at most 99 wt % ethylene content, such as at most 95, 90, 85, 80, 75, or 70 wt % in various embodiments (again based on the weight of the ethylene-based copolymer). Ethylene-based copolymers of the present disclosure further comprise a $C_3$ to $C_{12}$ α-olefin content and, optionally, a polyene (preferably diene) content comprising one or more polyenes (preferably one or more dienes). $C_3$ to $C_{12}$ α-olefins include propylene, butylene, pentylene, hexylene, heptylene, octylene, nonylene, decylene, undecylene, dodecylene, and branched isomers thereof. Propylene is particularly preferred according to some embodiments (e.g., such that the ethylene-based copolymer may be an EP(D)M copolymer), while butylene (1-butene) is preferred in yet other embodiments (e.g., such that the ethylene-based copolymer may be an EB(D)M copolymer).

With respect to the polyenes, any polyene suitable in the PEDM is suitable for inclusion in the ethylene-based copolymer, with VNB or ENB, and in particular ENB, preferred. According to yet other embodiments, suitable polyenes may include conjugated dienes. Conjugated dienes include 1,3-butadiene, 2-methyl-1,3-butadiene, 2,3-di($C_1$ to $C_5$ alkyl)-1,3-butadienes, such as, for example, 2,3-dimethyl-1,3-butadiene, 2,3-diethyl-1,3-butadiene, 2-methyl-3-ethyl-1,3-butadiene or 2-methyl-3-isopropyl-1,3-butadiene, an aryl-1,3-butadiene, 1,3-pentadiene or 2,4-hexadiene. Dienes also include vinylaromatic compounds: styrene, ortho-, meta- or para-methylstyrene, the "vinyltoluene" commercial mixture, para-(tert-butyl)styrene, methoxystyrenes, chlorostyrenes, vinylmesitylene, divinylbenzene or vinylnaphthalene. Ethylene-based copolymers of various embodiments preferably have 0 to 20 wt % polyene content, such as 0 to 15 wt %, preferably 1 to 10 wt %, 2 to 9 wt %, or 3 to 7 wt %, with ranges from any of the foregoing low ends to any of the foregoing high ends also contemplated in various embodiments.

Further, in certain embodiments, ethylene-based copolymers of the present disclosure can have isotactic polypropylene content.

According to some embodiments, the ethylene-based copolymer exhibits more crystallinity than the PEDM; for instance, it may have Hf>1 J/g. According to yet further embodiments, crystallinity of ethylene-based copolymers of the present disclosure may be expressed in terms of percentage of crystallinity (i.e., % crystallinity), as determined according to the DSC procedure described herein. An ethylene-based copolymer may have a % crystallinity of from 5% to 80%, such as from 10% to 60%, such as from 20% to 40%. (The degree of crystallinity is determined by dividing heat of fusion measured with the heat of fusion for 100% crystalline polyethylene which has the value of 293 J/g (B. Wunderlich, Thermal Analysis, Academic Press, 1990, pp. 417-431).)

An ethylene-based copolymer may be an ethylene-propylene copolymer and in particular an EP(D)M terpolymer (such as Vistalon™ 706, Tafmer™, or Versify™) or an EB(D)M terpolymer. Ethylene-based copolymers of the present disclosure can have a weight average molecular weight (Mw) from 10,000 g/mol to 400,000 g/mol, such as 100,000 g/mol to 200,000. They may also or instead have a melting point (DSC) of less than 110° C., such as less than 100° C.

Compositions described herein can comprise a single ethylene-based copolymer or a mixture of several ethylene-based copolymers, it being possible for the ethylene-based copolymers to be used in combination with any type of synthetic elastomer other than an ethylene-based copolymer, indeed even with polymers other than elastomers, for example thermoplastic polymers.

In at least one embodiment, the second polymer (ethylene-based copolymer) is a polyethylene-polybutadiene block-copolymer, wherein the polyethylene-polybutadiene block-copolymer is a block copolymer having the general formula: PE-XL-fPB; where "PE" is a polyethylene block having a weight average molecular weight within the range from 1,000 to 150,000 g/mol, the "fPB" is a functionalized polar polybutadiene block having a weight average molecular weight from 500 g/mol to 30,000 g/mol, and "XL" is a cross-linking moiety that covalently links the PE and fPB blocks; and wherein the Maximum Energy Loss (Tangent Delta) of the immiscible polyolefin domain is a temperature within the range from −30° C. to 10° C.

In at least one embodiment, compositions of the present disclosure comprise 15 wt % to 60 wt % of a styrenic copolymer; 1 wt % to 60 wt % of a polybutadiene polymer; 1 wt % to 60 wt % of natural rubber or synthetic polyisoprene; 15 wt % to 60 wt % of a functionalized styrenic copolymer; 1 wt % to 60 wt % of a functionalized polar polybutadiene polymer; or 1 wt % to 60 wt % of natural rubber or functionalized synthetic polyisoprene.

Polymer Blending

Compositions of the present disclosure may be formed by combining the first polymer (PEDM) and the second polymer (ethylene-based copolymer) using any suitable method known in the polymer processing art. For example, a composition may be made by blending the first polymer and second polymer in solution and generally removing the blend. This polymer composition has predetermined amounts of the first polymer and second polymer and may be made by independent polymerization of the first and second elastomeric polymeric components. Such individual polymerization may be conducted in series or parallel polymerization reactors or in a single polymerization reactor with at least two different polymerization catalysts. Procedures for the recovery of such a predetermined composition are described in U.S. Pat. No. 4,722,971 which are incorporated herein by reference. The disclosure includes traditional Ziegler-Natta catalyst systems, however metallocene catalyst systems are also contemplated for the present disclosure.

In at least one embodiment, a method for preparing a composition of the first polymer (PEDM) and the second polymer (ethylene-based copolymer) includes contacting in a first reactor a first metallocene catalyst with ethylene, propylene, and a diene to form a first polymer. The first polymer comprises from 1 wt % to 10 wt % diene content, such as from 2 wt % to 4 wt %, based on the total weight of the polymer; from 8 wt % to 45 wt % ethylene content, such as 12 wt % to 40 wt %, (e.g., 30 to 40 wt %, or 12 to 25 wt %), based on the total weight of the polymer; and from 50 wt % to 91 wt %, such as 55 to 85 wt %, atactic propylene content. The method further includes contacting in a second reactor (or the first reactor) a second metallocene catalyst with ethylene and propylene, and optionally a diene, to form a second polymer such as an EP copolymer or EP(D)M terpolymer. Methods can include transferring the first polymer to the second reactor or the second polymer to the first reactor and recovering from the second reactor or the first reactor, respectively, a composition comprising from 1 phr to 20 phr, such as about 5 phr to 30 phr, such as about 5 phr to about 15 phr, of the first polymer and from 70 phr to 99 phr of the second polymer. The recovered polymer composition may then be cross-linked, for example, as described in more detail below.

Alternatively, in at least one embodiment, a blend of first polymer and second polymer may be prepared by combining the first polymer from the first reactor and the second polymer from the second reactor and mixed, for example, in a production extruder, such as the extruder on an injection molding machine or on a continuous extrusion line.

In at least one embodiment, the method of blending the polymers may be to melt-blend the polymers in a batch mixer, such as a Banbury™ or Brabender™ mixer. Blending may include melt blending the first polymer and the second polymer in an extruder, such as a single-screw extruder or a twin-screw extruder. Extrusion technology for polymer blends is well known in the art, and is described in more detail in, for example, *PLASTICS EXTRUSION TECHNOLOGY*, F. Hensen, Ed. (Hanser, 1988), pp. 26-37, and in *POLYPROPYLENE HANDBOOK*, E. P. Moore, Jr. Ed. (Hanser, 1996), pp. 304-348.

The first polymer and the second polymer may also be blended by a combination of methods, such as dry blending followed by melt blending in an extruder, or batch mixing of some components followed by melt blending with other components in an extruder. The first polymer and the second polymer may also be blended using a double-cone blender, ribbon blender, or other suitable blender, or in a Farrel Continuous Mixer (FCM™).

Compositions

Compositions of the present disclosure include and/or are the reaction product of the first polymer and the second polymer (as a polymer blend or otherwise) described above (and in whatever form: pellet, bale, or otherwise). Compositions of the present disclosure may further include and/or be the reaction product of any one or more additives. Additives include curatives, cross-linking agents, fillers, process oils, plasticizers, compatibilizers, cross-linkers, and the like.

In embodiments where curatives, e.g., cross-linking agents or vulcanizing agents, are present in a composition, the polymers of the composition may be present in at least partially cross-linked form (that is, at least a portion of the polymer chains are cross-linked with each other, e.g., as a result of a curing process typical for EP(D)M rubbers). Accordingly, particular embodiments provide for an at least partially cross-linked elastomeric composition made by mixing a composition comprising: (a) a first polymer (PEDM) and a second polymer (ethylene-based copolymer) (which may be mixed in accordance with any of the above-described methods for polymer blends); (b) one or more vulcanization activators; (c) one or more vulcanizing agents; and/or (d) one or more further additives.

Suitable vulcanization activators include zinc oxide, stearic acid, and the like. These activators may be mixed in amounts ranging from 0.1 phr to 20 phr. Different vulcanization activators may be present in different amounts. For instance, where the vulcanization activator includes zinc oxide, the zinc oxide may be present in an amount from 1 phr to 20 phr, such as from 2.5 phr to 10 phr (e.g., about 5 phr), while stearic acid may preferably be employed in amounts ranging from 0.1 phr to 5 phr, such as 0.1 phr to 2 phr (e.g., about 1.5 phr).

Any suitable vulcanizing agent known in the art may be used. Of particular note are curing agents as described in Col. 19, line 35 to Col. 20, line 30 of U.S. Pat. No. 7,915,354, which description is hereby incorporated by reference (e.g., sulfur, peroxide-based curing agents (Vulcup 40 KE available from Arkema of Colombes, France, resin curing agents, silanes, and hydrosilane curing agents). Other examples include phenolic resin curing agents (e.g., as described in U.S. Pat. No. 5,750,625, also incorporated by reference herein). Cure co-agents may also be included (e.g., zinc dimethacrylate (Dymalink 708) or those described in the already-incorporated description of U.S. Pat. No. 7,915,354).

Further additives may be chosen from any known additives useful for EPDM compositions, and include, among others, one or more of:

Process oil, such as paraffinic and/or isoparaffinic process oil (examples including Sunpar™ 2280 (available from HollyFrontier Refining & Marketing LLC, Tulsa, Okla.); as well as Flexon™ 876, CORE™ 600 base stock oil, Flexon™ 815, and CORE™ 2500 base stock oil, available from ExxonMobil Chemical Company, Baytown, Tex. Particularly in embodiments where color of the end product may be important a white oil (e.g., API Group II or Group III base oil) may be used as process oil. Examples include paraffinic and/or isoparaffinic oils with low (under 1 wt %, preferably under 0.1 wt %) aromatic and heteroatom content. Compositions of the present disclosure may comprise process oil from 1 phr to 150 phr, such as 50 phr to 100 phr, such as 60 phr to 80 phr, or, for sponge grades, from 50 phr to 200 phr, such as 70 phr to 150 phr, such as 80 phr to 100 phr, and preferred process oils have viscosity at 40° C. from 80 CSt to 600 CSt;

Vulcanization accelerators: compositions of the present disclosure can comprise 0.1 phr to 15 phr, such as 1 phr to 5 phr, or 2 phr to 4 phr, with examples including thiazoles such as 2-mercaptobenzothiazole or mercaptobenzothiazyl disulfide (MBTS); guanidines such as diphenylguanidine; sulfenamides such as N-cyclohexylbenzothiazolsulfenamide; dithiocarbamates such as zinc dimethyl dithiocarbamate, zinc diethyl dithiocarbamate, zinc dibenzyl dithiocarbamate (ZBEC); and zinc dibutyldithiocarbamate, thioureas such as 1,3-diethylthiourea, thiophosphates and others;

Processing aids (e.g., polyethylene glycol or zinc soap);

Carbon black (e.g., having particle size from 20 nm to 600 nm and structure having DBPA (dibutyl phthalate absorption number) within the range from 0 to 150, as measured by the DBP method described in ASTM D2414. Compositions of the present disclosure may comprise carbon black from 1 phr to 500 phr, preferably from 1 phr to 200 phr, such as from 50 phr to 150 phr;

Mineral fillers (talc, calcium carbonate, clay, silica, aluminum trihydrate, and the like), which may be present in the composition from 1 phr to 200 phr, preferably from 20 phr to 100 phr, such as from 30 phr to 60 phr;

Where foaming may be desired, sponge or foaming grade additives, such as foaming agent or blowing agent, particularly in very high Mooney viscosity embodiments, such as those suitable for sponge grades. Examples of such agents include: azodicarbonamide (ADC), ortho-benzo sulfonyl hydrazide (OBSH), p-toluenesulfonylhydrazide (TSH), 5-phenyltetrazole (5-PT), and sodium bicarbonate in citric acid. Microcapsules may also or instead be used for such foaming applications. These may include a thermo-expandable microsphere comprising a polymer shell with a propellant contained therein. Examples are known in the art and described in, for example, U.S. Pat. Nos. 6,582,633 and 3,615,972, WIPO Publication Nos. WO 99/46320 and WO 99/43758, and contents of which hereby are incorporated by reference. Examples of such thermo-expandable microspheres include EXPANCEL™ products commercially available from Akzo Nobel Nev., and ADVANCELL™ products available from Sekisui. In other embodiments, sponging or foaming may be accomplished by direct injection of gas and/or liquid (e.g., water, $CO_2$, $N_2$) into the rubber in an extruder, for foaming after passing the composition through a die; and Various other additives may also be included, such as antioxidants (e.g., 1,2-dihydro-2,2,4-trimethylquinoline), stabilizers, anticorrosion agents, UV absorbers, antistatics, slip agents, moisture absorbents (e.g., calcium oxide), pigments, dyes or other colorants.

The at least partially cross-linked polymer compositions of the present disclosure are formed by mixing the above-described components in any suitable manner described in the Polymer Blending section above, e.g. Banbury mixer. Mixing in these embodiments may include any one or more of typical mixing processes for EP(D)M compositions, such as open mill mixing, mixing using internal mixers or kneaders, and extrusion (e.g., through a twin-screw extruder).

Further, in some embodiments, additives may be incorporated into a polymer blend directly or as part of a masterbatch, i.e., an additive package containing several additives to be added at one time in predetermined proportions. The masterbatch may be added in any suitable amount. For example, a masterbatch comprising an additive may be used in an amount ranging from about 0.1 to about 10 wt %, or from about 0.25 to about 7.5 wt %, or from about 0.5 to about 5 wt %, or from about 1 to about 5 wt %, or from about 2 to about 4 wt %, based on the total weight of the polymer blend and the masterbatch. This is a common practice in polymer processing, typically used for addition of color, additives, and fillers to final compositions. Dispersion (or "letdown") of the masterbatch may take place as part of a processing step used to fabricate articles, such as in the extruder on an injection molding machine or on a continuous extrusion line, or during a separate compounding step.

Transmission Belts

Compositions of the present disclosure may be used as one or more components of a transmission belt.

FIG. 1 is a fragmented perspective view of a transmission belt in accordance with some embodiments of the present disclosure. As shown in FIG. 1, synchronous belt 100 includes elastomeric main body portion 102 and sheave contact portion 104 positioned along the inner periphery of main body portion 102. Main body portion 102 comprises one or more PEDM-including compositions of the present disclosure. Sheave contact portion 104 is configured to form alternating transverse projections 106 and troughs 108 configured to couple with a transverse-grooved pulley or sprocket. Tensile layer 110 is positioned within main body portion 102 for providing support and strength to belt 100. Tensile layer 110 includes a plurality of tensile cords 112 disposed longitudinally along the length of main body portion 112. Cords 112 comprise any suitable material, such as one or more of cotton, rayon, polyamide, polyester, aramid, steel, glass, carbon, polyketone, basalt, boron, or discontinuous fibers oriented for low load carrying capability. Reinforcing fabric 114 is disposed on projections 106 and troughs 108 and to form a sheave contact portion. Reinforcing fabric 114 may be of any suitable configuration such as a conventional weave consisting of warp and weft threads at an angle, or may include warp threads held together by space pick cords, or a knitted or braided configuration, or a nonwoven fabric. Suitable fabrics include one or more of cotton, polyester, polyamide, acrylic, aramid, polyketone, hemp, jute, or fiberglass.

Figure 2:
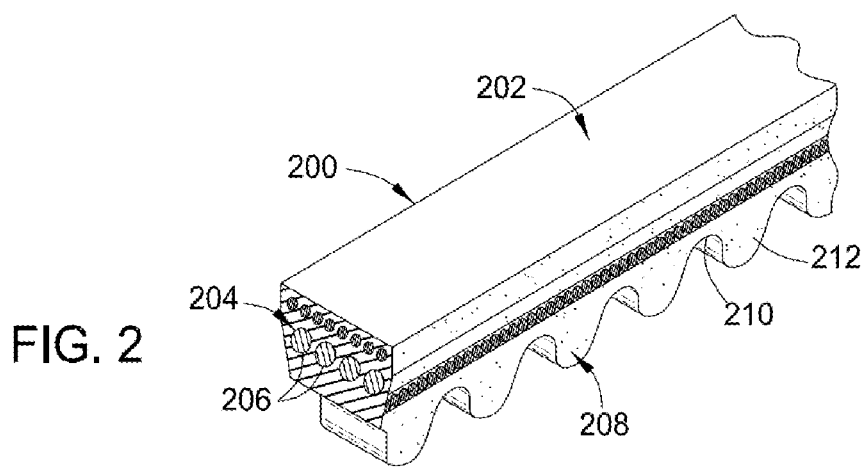
FIG. 2 is a fragmented perspective view of a transmission belt in accordance with further embodiments of the present disclosure.

FIG. 2 is a fragmented perspective view of a transmission belt according to further embodiments of the present disclosure. As shown in FIG. 2, notched V-belt 200 includes elastomeric body portion 202 and tensile layer 204 comprising cords 206. Main body portion 202 comprises one or more compositions (PEDM-containing compositions) of the present disclosure. Cords 206 comprise any suitable material, such as one or more of cotton, rayon, polyamide, polyester, aramid, steel, glass, carbon, polyketone, basalt, boron, or discontinuous fibers oriented for low load carrying capability. V-belt 200 includes sheave contact portion 208 having two juxtaposed sides of the belt, designed to wedge into a V-sheave. V-belt 200 includes troughs 210 and projections 212. Included in the category of V-belts are those V-belts designed for continuously variable transmission ("CVT") applications, which often exhibit a belt body relatively wider than the belt thickness.

Figure 3:
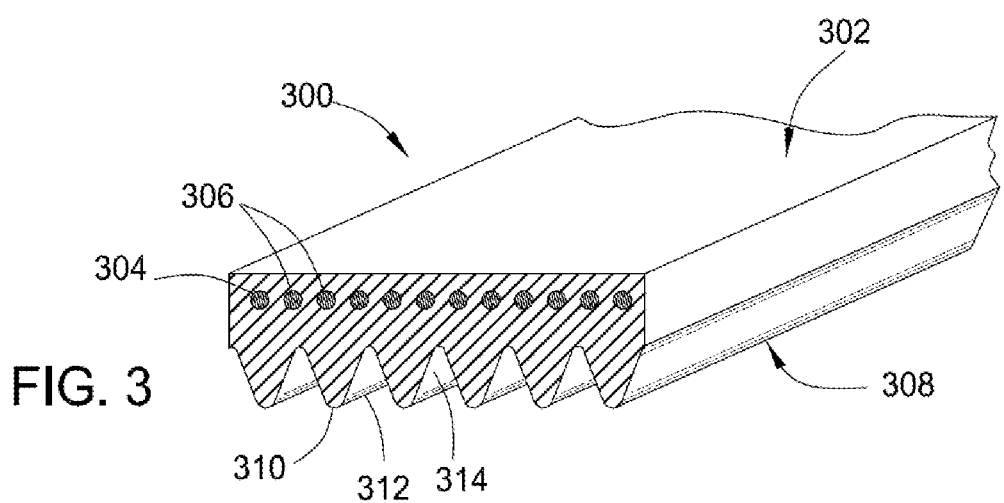
FIG. 3 is a fragmented perspective view of a transmission belt in accordance with yet further embodiments of the present disclosure.

FIG. 3 is a fragmented perspective view of a transmission belt according to one embodiment of the present disclosure. As shown in FIG. 3, multi-V-ribbed belt 300 includes main body portion 302 and also tensile reinforcement member 304 comprising cords 306. Main body portion 302 comprises one or more compositions (PEDM-containing compositions) of the present disclosure. Longitudinally grooved sheave contact portion 308 comprises a plurality of projections 310 alternating with a plurality of troughs 312 which together define driving surfaces 314 of the belt 300. In each of these instances of FIG. 1, FIG. 2, and FIG. 3, the respective sheave contact portion is coupleable/coupled with the respective main body portion and may be formed from the same material or layered with different material.

In each of the three exemplary belt embodiments shown in FIG. 1, FIG. 2, and FIG. 3, compositions (PEDM-containing compositions) of the present disclosure that form the main belt body portion, may further comprise any suitable polymer. Suitable additional polymers include polyurethane elastomers (including as well polyurethane/urea elastomers and so-called millable gums) (PU), polychloroprene rubber (CR), acrylonitrile butadiene rubber (NBR), hydrogenated NBR (HNBR), styrene-butadiene rubber (SBR), alkylated chlorosulfonated polyethylene (ACSM), polyepichlorohydrin, polybutadiene rubber (BR), natural rubber (NR), and ethylene alpha olefin elastomers such as ethylene propylene copolymers (EPM), ethylene propylene diene terpolymers (EPDM), ethylene octene copolymers (EOM), ethylene butene copolymers (EBM), ethylene octene terpolymers (EODM); ethylene butene terpolymers (EBDM); ethylene vinylacetate elastomers (EVM); ethylene methylacrylate (EAM); and silicone rubber.

To form the elastomeric belt body portion of a transmission belt in accordance with at least one embodiment of the present disclosure, the polymers may be blended according to known mixing methods and, as described above, with conventional rubber compounding ingredients including but not limited to fillers, plasticizers, stabilizers, vulcanization agents/curatives, coagents, and accelerators, in amounts conventionally employed.

EXAMPLES

Molecular weights (number average molecular weight (Mn), weight average molecular weight (Mw), and z-average molecular weight (Mz)) were determined using a Polymer Laboratories Model 220 high temperature GPC-SEC equipped with on-line differential refractive index (DRI), light scattering (LS), and viscometer (VIS) detectors. It used three Polymer Laboratories PLgel 10 m Mixed-B columns for separation using a flow rate of 0.54 ml/min and a nominal injection volume of 300 μL. The detectors and columns were contained in an oven maintained at 135° C. The stream emerging from the SEC columns was directed into the miniDAWN (Wyatt Technology, Inc.) optical flow cell and then into the DRI detector. The DRI detector was an integral part of the Polymer Laboratories SEC. The viscometer was inside the SEC oven, positioned after the DRI detector. The details of these detectors as well as their calibrations have been described by, for example, T. Sun, P. Brant, R. R. Chance, and W. W. Graessley, in 34(19) MACROMOLECULES, 6812-6820, (2001).

Polymer Formation:

Second polymers (ethylene-based copolymers) were purchased from commercial sources. First polymers (PEDMs) were synthesized as follows: The reactor was a 0.15-liter reactor. The reactor was a stainless steel autoclave reactor equipped with a stirrer, a water cooling/steam heating element (with a temperature controller), and a pressure controller, made by Autoclave Engineers, Erie Pa. The reactor was designed to operate at a maximum pressure and temperature of 2000 bar (30 kpsi) and 225° C., respectively, although for the current experiments, the nominal reactor pressures were lower, from 1600 to 1700 psig. The nominal reactor vessel volume was 150 mL. A pressure transducer measured the pressure in the reactor. The reactor temperature was measured using a type-K thermocouple. A flush-mounted rupture disk located on the side of the reactor provided protection against catastrophic pressure failure. All product lines were heated to ~120° C. to prevent fouling. The reactor had an electric heating band that was controlled by a programmable logic control device (PLC). Except for the heat losses to the environment, the reactor did not have cooling (close to adiabatic operations).

Solvents (isohexane) and comonomers (propylene, ethylene, and ENB) were first purified by passing through a three-column purification system. The purification system consisted of an Oxiclear column (Model #RGP-R1-500 from Labclear) followed by a 5 Angstrom and a 3 Angstrom molecular sieve column. Purification columns were regenerated periodically whenever there was evidence of lower activity of polymerization. Both the 3 Angstrom and 5 Angstrom molecular sieve columns were regenerated in-house under nitrogen at a set temperature of 260° C. and 315° C., respectively. The molecular sieve material was purchased from Aldrich. Ethylene was delivered as a gas solubilized in the chilled solvent/monomer mixture. The purified solvents and monomers were then chilled to −15° C. by passing through a chiller before being fed into the reactor through a manifold. Solvent and monomers were mixed in the manifold and fed into reactor through a single tube. Catalyst and monomer contacts took place in the reactor. All liquid flow rates were measured using mass flow controllers.

All catalyst solutions were kept in an inert atmosphere and fed into reactor using an ISCO syringe pump. Tri-n-octylaluminum (TNOAL) solution (available from Sigma Aldrich, Milwaukee, Wis.) was further diluted in isohexane and used as a scavenger. Scavenger feed rate was adjusted to maximize the catalyst efficiency. The catalyst was 1,1'-bis(4-triethylsilylphenyl)methylene-(cyclopentadienyl) (2,7-di-tertiary-butyl-fluoren-9-yl)hafnium dimethyl. Other Cs symmetry metallocene precursors with good diene incorporation and MW capabilities could also be used such as those described herein. The activator was N,N-dimethylanilinium tetrakis(pentafluorophenyl)borate. Other non-coordinating anion type activators or methyl alumoxane (MAO) could also be used.

The reactor was first prepared by continuously $N_2$ purging at a maximum allowed temperature, then pumping isohexane and scavenger solution through the reactor system for at least one hour. Monomers and catalyst solutions were then fed into the reactor for polymerization. Once the activity was established and the system reached equilibrium, the reactor was lined out by continuing operation of the system under the established condition for a time period of at least five times of mean residence time prior to sample collection. The conversion in the reactor was monitored by an on-line gas chromatograph (GC) that sampled both the feed and the effluent. The GC analysis utilized the propane impurity present in the propylene feed as internal standard. The reactor temperature and the temperature difference across the reactor wall were maintained constant by adjusting the reactor heater output (skin temperature) and the catalyst feed rate.

The resulting mixture, containing mostly solvent, polymer and unreacted monomers, was collected in a collection box. The collected samples (PEDM A, PEDM B, and PEDM C) were washed with xylene to remove unreacted macromers, and then air-dried in a hood to evaporate most of the solvent followed by drying in a vacuum oven at a temperature of 90° C. for 12 hours. The vacuum oven-dried samples were weighed to obtain yields. All the reactions were carried out at a gauge pressure of 2.4 MPa.

Characterization of the PEDM A, PEDM B, and PEDM C samples is provided in Table 1 below. All three samples were amorphous with about zero crystallinity.

Polymers:

Table 1 illustrates the polymer characteristics of example EP(D)M and PEDM polymers. The reference polymer Vistalon™ 706 is an ethylene-propylene copolymer having a Mooney Viscosity (ML, 1+4@ 125° C.) of 42 MU and an ethylene content of 65 wt %. Vistalon™ 9301 is an EP(D)M terpolymer with a higher Mooney Viscosity than Vistalon™ 706 (specifically, 67 MU (ML, 1+4@ 125° C.)), and with ENB as the diene. PEDM polymers (A, B, and C) of Table 1 have an ethylene content ranging from 35 wt % (PEDM A) to 15 wt % (PEDM C), ENB content of 3 wt % and MFR of 7.5 g/10 min (230° C., 2.16 kg), determined using a Dynisco Kayeness Polymer Test Systems Series 4003 apparatus following ASTM D1238 method. The glass transition temperature (Tg) of the PEDM terpolymers was measured using differential scanning calorimetry (DSC) in accordance with the procedures previously described. The PEDM samples' Tg decreased with increasing ethylene content. The PEDM polymers were synthesized using metallocene catalyst: 1,1'-bis(4-triethylsilylphenyl)methylene-(cyclopentadienyl) (2,7-di-tertiary-butyl-fluoren-9-yl)hafnium dimethyl and activator: N,N-dimethylanilinium tetrakis(pentafluorophenyl)borate.

TABLE 1

| Polymer | Mooney Viscosity (1 + 4) 125° C. (MU) | Ethylene Content (wt %) | ENB Content (wt %) | Melt Flow Rate (g/10 min) | Tg (° C.) |
| --- | --- | --- | --- | --- | --- |
| Vistalon ™ 706 | 42 | 65 | 0 | — | — |
| Vistalon ™ 9301 | 67 | 67 | 2.8 | — | — |
| PEDM A | — | 35 | 2.8 | 7.5 | −33.9 |
| PEDM B | — | 21 | 3.1 | 7.5 | −27.2 |
| PEDM C | — | 15 | 2.9 | 7.2 | −20.5 |

Compositions:

Compositions comprising EP(D)M polymer, carbon black, oil and curatives were prepared in a 410 cc Banbury® Mixer. Table 2 shows the representative compositions. A mix was adopted for compounding using a fill factor of 70%. At the start of mixing, polymer, carbon black and additives were introduced with the rotor speed at 50 rpm. The ram was raised three times during the mixing cycle. Mixing was continued for 5 minutes at which time the batch was discharged. The temperature of the discharged batch on an average was about 250° F. About 5 grams of the compound masterbatch was isolated for rheology measurements.

TABLE 2

| Example | C1 | 2 | 3 | 4 | 5 | 6 | 7 |
| --- | --- | --- | --- | --- | --- | --- | --- |
| Vistalon ™ 706 | 100 | 95 | 90 | 95 | | 90 | 95 | 90 |
| PEDM A | | 5 | 10 | | | | |
| PEDM B | | | | 5 | 10 | | |
| PEDM C | | | | | | 5 | 10 |

| Component | Density | Phr |
| --- | --- | --- |
| First Pass | | |
| Polymer | 0.864 | 100 |
| Black 330 | 1.800 | 60 |
| Dymalink 708 (ZDMA) | 1.500 | 15 |
| Sunpar 2280 | 0.899 | 10 |
| Zinc Oxide | 5.610 | 5.0 |
| Zinc Stearate | 1.100 | 2.0 |
| Agerite Resin D | 1.060 | 1.0 |
| Mill addition (entire batch) | | |
| Vulcup 40 KE | 1.500 | 5.0 |
| Dymalink 719 | 1.050 | 0.3 |
| Specific Gravity | | 1.117 |
| Total phr | | 193.0 |
| Master Batch | | |
| Total phr | | 198.3 |
| Batch Factor | | 1.62 |
| Batch Wt. | | 320.7 |
| Fill Factor (%) | | 70 |
| Mixer Volume (cc) | | 410 |

1<sup>st</sup> Pass Masterbatch 50 rpm
0-Add polymer, black, oil, etc.
Sweep @ 140° F.
Sweep @ 200° F.
Sweep @ 240° F.
Ram 60 psi

| Dump Temperature (° F.) | 251 |
| --- | --- |
| Dump Weight (gm) | 329 |

The curatives were added to the masterbatch (329 gm) on a two roll mill. The batch was passed several times through the mill to ensure a homogeneous dispersion of the curatives. The batches containing the curatives were cured in an electric press and tested for various physical and mechanical properties.

In Table 2, "Polymer" indicates the respective amount of Vistalon™ 706 polymer (plus PEDM polymer as in Examples 2-7) included in the composition; Black 330 is a carbon black (pellet form); Sunpar 2280 is a paraffinic process oil; Zinc Stearate and ZnO (zinc oxide) are vulcanization activators; Agerite Resin D is the antioxidant 1,2-dihydro-2,2,4-trimethylquinoline; Dymalink 708 (ZDMA) (zinc dimethacrylate) and Dymalink 719 are each vulcanization activators; and Vulcup 40 KE is an organic peroxide vulcanizing/cross-linking agent. The composition is considered a useful composition for EP(D)M compounds, and therefore is taken as useful for testing the processability of Examples 2-7 as compared to comparative Example C1.

The composition was mixed according to the following procedure, to form an elastomeric composition. Polymer and other components in the "First Pass" section of Table 2 were added to a 410 cc Banbury-type tangential internal mixer (available from Farrel Corporation) at 0'00" and 0'30", respectively, and operation of the mixer carried out for 3 minutes as shown in Table 3 below for "First Pass" parameters (specifically, operation at 90 RPM, 70° C.). The ram was then raised up, mixing continued for 15 more seconds, and the "First Pass" components were dumped and milled in a 2-roll mill. The mixed and milled "First Pass" components were allowed to cool. Then, the cooled "First Pass" components and the "Mill Addition" components of Table 2 were added to the mixer, and operation of the mixer proceeded for 1 additional minute with the "Mill Addition" parameters in Table 3 (70 RPM, 30° C.). After the 1-minute 2nd pass, the mixed compound was dumped, milled, and allowed to cool, then collected for further analysis/rheology testing (uncured), and then press cured at 180° C. to form an at least partially cured composition (which is suitable for evaluating, for example, tack and green properties).

TABLE 3

Mixer Operation for Examples C1 and 2-7 Compound Formation
Upside Down - 2 pass
Farrel mixer - NCV 1600cc - Banbury type
Loading: 70% NCV
Ram pressure: 2 kg
Rotor speed: 90 RPM (First Pass) 170 RPM (Second Pass)
Mixer start temperature: ±70° C. (First Pass)/30° C. (Second Pass)
Mixing time: 3'15" (First Pass)/1' (Second Pass)

| Time: | Action: |
| --- | --- |
| 0'00" | Add Polymer, ram down |
| 0'30" | Add remaining "first pass" components |
| | sweep at 90° C. |
| | sweep at 105° C. |
| 3'00" | Ram up |
| 3'15" | Dump |

Figure 4:
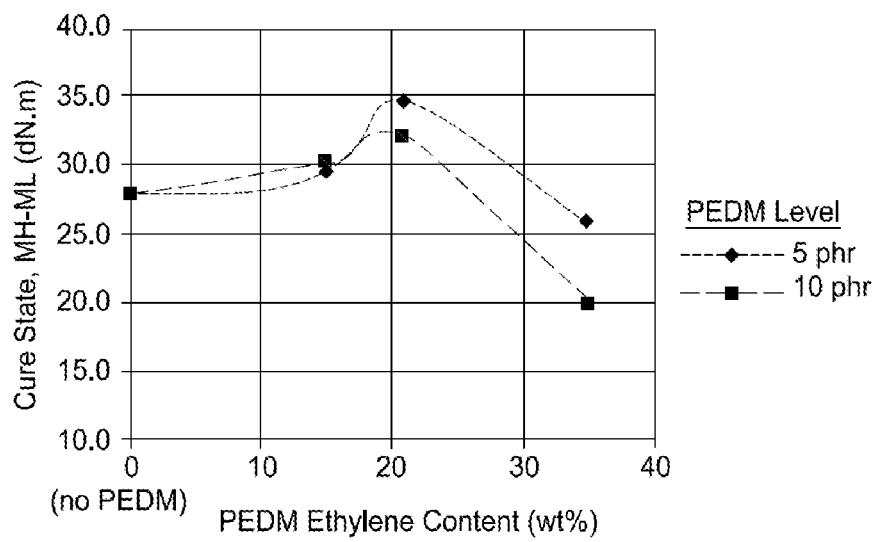
FIG. 4 is a graph illustrating cure state versus PEDM ethylene content in accordance with various embodiments of the present disclosure.

Cure Properties of Formulations based on Vistalon™ 706:

FIG. 4 is a graph illustrating cure state versus PEDM ethylene content. The cure state is defined as the difference between the highest torque value (MH) and the lowest torque value (ML) registered during cure in a moving die rheometer at 180° C. with 0.5 degree arc. As shown in FIG. 4, the formulation labeled "no PEDM" is the control compound formulated with Vistalon™ 706 copolymer. The curves correspond to the levels of PEDM, at 5 phr and 10 phr respectively, as a replacement for the EP copolymer in the composition.

Figure 5:
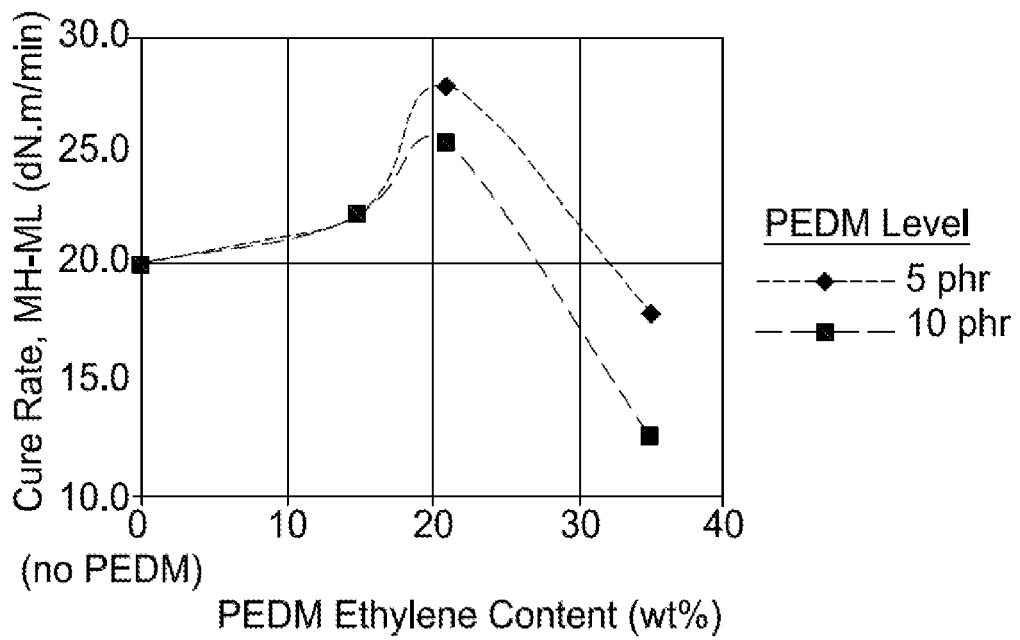
FIG. 5 is a graph illustrating cure rate versus PEDM ethylene content in accordance with various embodiments of the present disclosure.

FIG. 5 is a graph illustrating cure rate versus PEDM ethylene content. Cure rate is determined as [(MH−ML)·0.9−21]/(Tc$_{90}$−Ts$_2$), where the cure state is the difference between MH and ML, $Tc_{90}$ is the time to achieve 90% of the maximum MH, and $Ts_2$ is the cure time to 2 torque units increase. As shown in FIG. 5, the formulation labeled "no PEDM" is the control compound formulated with Vistalon™ 706 copolymer. The curves correspond to the levels of PEDM, at 5 phr and 10 phr respectively, as a replacement for a portion of the EP copolymer Vistalon™ 706 in the composition.

As shown in FIG. 4 and FIG. 5 respectively, cure state and cure rate increase relative to the Vistalon™ 706 control up to 20 wt % ethylene content of the PEDM, beyond which it is lower than the control compound. At higher PEDM ethylene content, the formulation containing 10 phr PEDM shows a greater decrease in cure properties.

Figure 6:
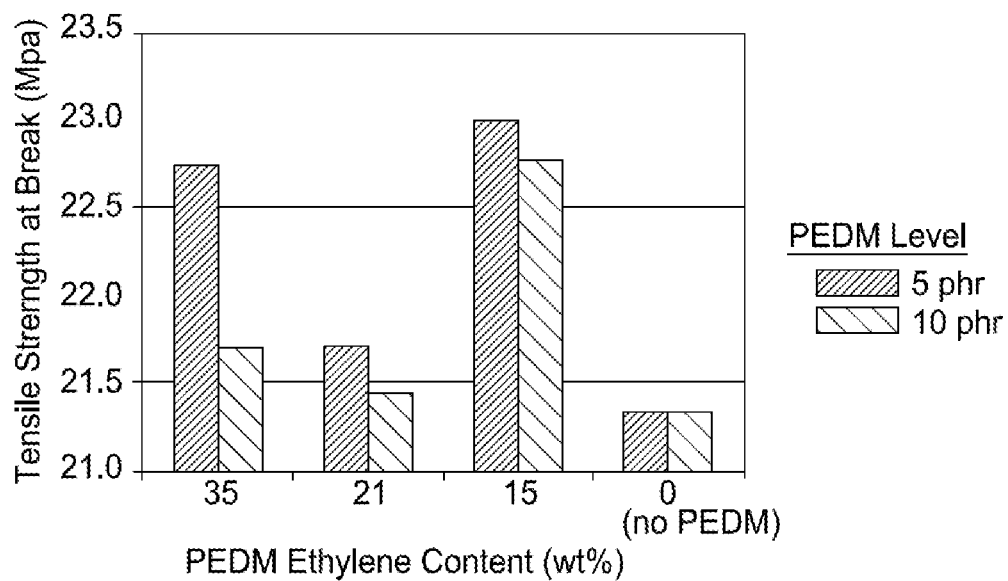
FIG. 6 is a graph illustrating tensile strength at break versus PEDM ethylene content in accordance with various embodiments of the present disclosure.
Figure 7:
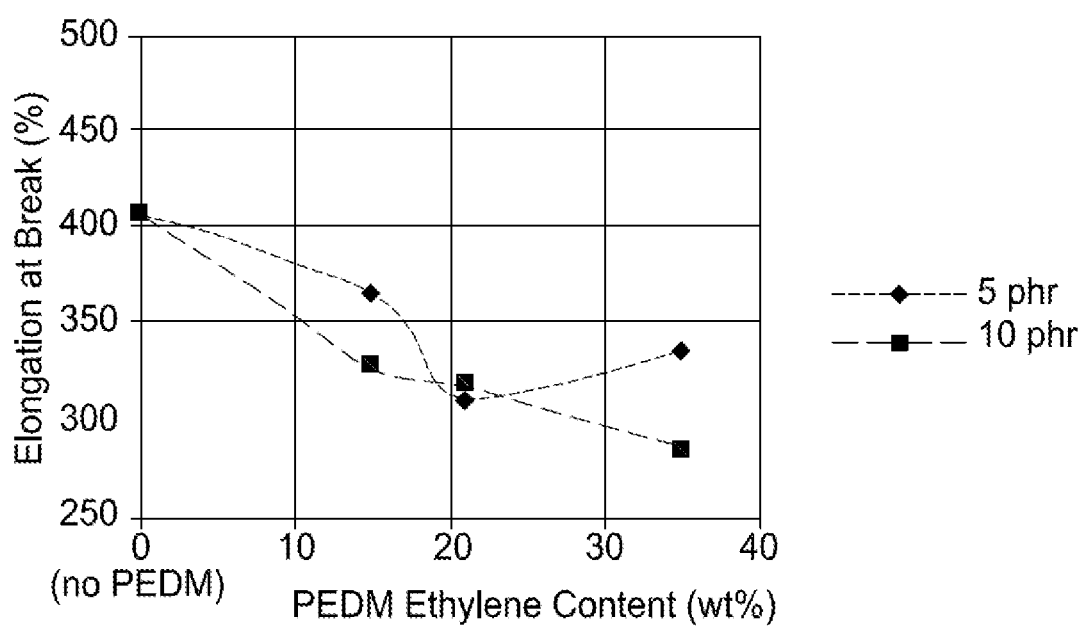
FIG. 7 is a graph illustrating elongation at break (%) versus PEDM ethylene content in accordance with various embodiments of the present disclosure.

FIG. 6 is a graph illustrating tensile strength at break (ASTM D638) versus PEDM ethylene content. As shown in FIG. 6, in all examples, the tensile strength is higher compared to the control composition without the PEDM. FIG. 7 is a graph illustrating elongation at break (%) versus PEDM ethylene content (also determined per ASTM D638). As shown in FIG. 7, the elongation at break decreases with the addition of PEDM, particularly at the higher 10 phr level and with increasing ethylene content of the PEDM polymer. Compound Properties of Formulations based on Vistalon™ 706:

The tack of the un-vulcanized (green) rubber compound was measured using a Tel-Tak apparatus (Monsanto Company, Model TT-1). A description of this test can be found in the publication J. R. Beatty, *Rubber Chem and Tech.*, 42, 1041 (1969). The test measured a force to separate a specimen from the metal surface (a polished stainless steel). The specimens were cut into 0.31"×1" strips reinforced with fabric backing. They were placed in the instrument at a right angle to the metal strip thus defining the area of contact. The contact time was 30 seconds and the contact pressure was 16 ounces. A small gear motor provided 1 inch/minute movement of the lower platen automatically when the dwell time interval was completed. The force to separate the two surfaces was measured by a force gauge with a built-in stop that left the pointer at the maximum reading. The tack is reported as the maximum force required to separate two identical rubber specimens.

The green strength and green tear of the formulation are measured per ASTM D6746 on un-cured masterbatch compositions in an Instron™ tensile test apparatus, using dumbbells cut per ASTM D412 die C.

Mooney scorch is measured per ASTM D1646. Mooney Scorch as set forth in Table 5 is essentially a measurement of the rate at which a rubber compound will cure or set up in a Mooney test. For example, t1 implies how long it takes for the compound to increase in viscosity by 1 Mooney Unit from the minimum value; t5 implies time for 5 MU increase, and so on. The faster a compound cures, the lower its Mooney Scorch times.

Table 4 illustrates the composition properties for the reference composition Example C1 and the inventive compositions of Examples 2 through 7 respectively formulated with PEDM of varying ethylene content and phr levels in the composition. Table 4 illustrates dependence of tack on the PEDM ethylene content for compositions that contain PEDM polymers at 5 phr and 10 phr levels respectively. The tack is higher in all formulations compared to the reference composition (having 100 phr Vistalon™ 706). The tack increases from 3.3 kPA to 5.5 kPA (a 67% increase) for the composition containing 15 wt % ethylene PEDM at 5 phr level. A similar increase is seen in the PEDM containing 21 wt % ethylene at 10 phr level in the compound.

Table 4 further illustrates that the 100% modulus and the 300% modulus of the cured compositions in examples 2-7 are higher compared to control composition C1. Modulus (100% and 300%), stress@break, and strain@break (ultimate elongation) were determined according to ISO 37 at 23° C. at 50 mm per minute by using an Instron testing machine. Oscillating disc rheometer (ODR) and moving die rheometer (MDR) were used to plot graphs of torque vs. time at a constant temperature to show how cure is proceeding. These results can be used to determine cure times (e.g., t90) calculated as the time for the torque to reach 90% of the maximum achievable torque.

TABLE 4

| Example | | C1 | 2 | 3 | 4 | 5 | 6 | 7 |
|---|---|---|---|---|---|---|---|---|
| Vistalon ™ 706 | | 100 | 95 | 90 | 95 | 90 | 95 | 90 |
| PEDM A | | | 5 | 10 | | | | |
| PEDM B | | | | | 5 | 10 | | |
| PEDM C | | | | | | | 5 | 10 |
| Compound Viscosity | MU | 115 | 111 | 115 | 117 | 116 | 111 | 119 |
| ML (1 + 4) 100° C. | | | | | | | | |
| Mooney Scorch at 125° C. | | | | | | | | |
| Min Viscosity | MU | 37 | 39 | 40 | 42 | 40 | 39 | 42 |
| t1 | min | 22.0 | 19.3 | 23.4 | 22.0 | 25.5 | 21.5 | 24.8 |
| t5 | min | 46.5 | 34.8 | 49.3 | 49.4 | 57.5 | 46.3 | 54.0 |
| MDR 180° C., 0.5 deg | | | | | | | | |
| ts1 | min | 0.43 | 0.54 | 0.48 | 0.42 | 0.38 | 0.42 | 0.43 |
| ts2 | min | 0.49 | 0.61 | 0.56 | 0.47 | 0.42 | 0.47 | 0.48 |
| t25 | min | 0.75 | 0.86 | 0.82 | 0.71 | 0.67 | 0.72 | 0.73 |
| t50 | min | 1.36 | 1.53 | 1.55 | 1.25 | 1.23 | 1.30 | 1.32 |
| t75 | min | 2.59 | 2.88 | 2.97 | 2.39 | 2.42 | 2.51 | 2.53 |
| t90 | min | 4.35 | 4.79 | 4.92 | 4.13 | 4.20 | 4.29 | 4.29 |
| t95 | min | 5.64 | 6.18 | 6.35 | 5.41 | 5.50 | 5.60 | 5.59 |
| Peak Rate | dN·m/min | 20 | 18 | 13 | 28 | 25 | 22 | 22 |
| MH-ML | dN·m | 28 | 26 | 20 | 35 | 32 | 30 | 30 |
| ODR 180° C. +/− 3 deg. Arc 6 min | | | | | | | | |
| ML | dN·m | 17 | 15 | 16 | 16 | 15 | 16 | 17 |
| MH | dN·m | 111 | 125 | 141 | 140 | 127 | 122 | 110 |
| ts2 | min | 0.98 | 1.05 | 0.93 | 0.93 | 0.95 | 1.04 | 0.99 |
| t25 | min | 1.45 | 1.53 | 1.43 | 1.42 | 1.39 | 1.53 | 1.46 |
| t50 | min | 2.03 | 2.08 | 2.03 | 1.97 | 2.01 | 2.15 | 2.09 |
| t90 | min | 4.36 | 4.37 | 4.31 | 4.12 | 4.28 | 4.44 | 4.40 |
| Peak Rate | dN·m/min | 63 | 78 | 84 | 89 | 74 | 68 | 59 |
| MH-ML | dN·m | 94 | 110 | 125 | 124 | 111 | 106 | 93 |
| Press Cure, 15 min at 180° C. | | | | | | | | |
| Hardness | Shore A | 80 | 81 | 81 | 81 | 81 | 79 | 81 |
| 100% Modulus | MPa | 5.2 | 6.2 | 6.3 | 6.0 | 6.3 | 5.7 | 6.2 |
| 300% Modulus | MPa | 17.8 | 21.3 | 16.5 | 20.3 | 19.7 | 19.9 | 21.5 |
| Stress@Break | MPa | 21.3 | 22.7 | 21.7 | 21.7 | 21.5 | 23.0 | 22.8 |
| Strain@Break | % | 407 | 336 | 285 | 313 | 317 | 364 | 328 |
| Tear Die C (Peak Value) | N/mm | 55.2 | 53.4 | 46.9 | 49.3 | 50.1 | 51.3 | 49.5 |
| Tel Tak test | | | | | | | | |
| Peak force | Pa | 3375 | 3985 | 4469 | 4757 | 5356 | 5443 | 4703 |
| Compound Green Strength | | | | | | | | |
| 25% Modulus | MPa | 1.8 | 1.8 | 1.8 | 1.7 | 1.7 | 1.7 | 1.7 |
| Green Tear Die C (Peak Value) | N/mm | 19.2 | 19.4 | 18.6 | 17.1 | 16.3 | 19.3 | 18.2 |

Figure 8:
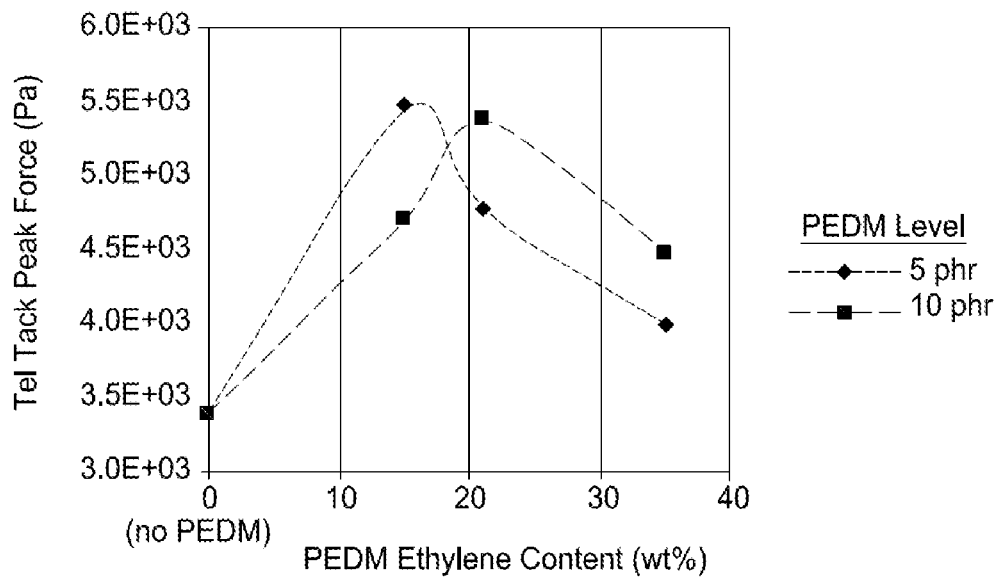
FIG. 8 is a graph illustrating Tel-Tak Peak Force versus PEDM ethylene content in accordance with various embodiments of the present disclosure.
Figure 9:
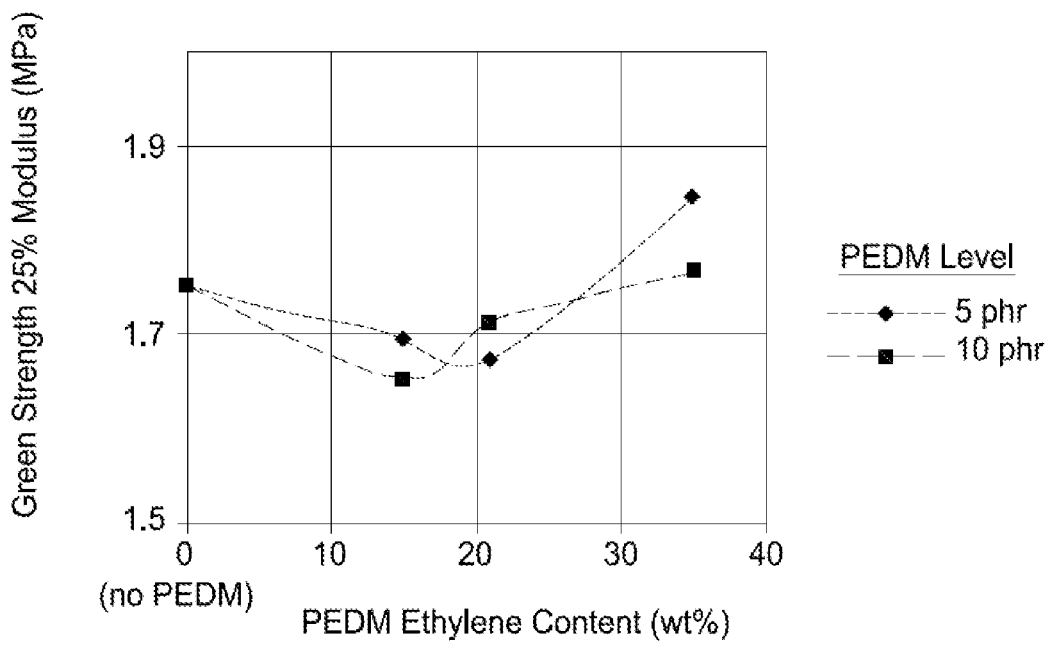
FIG. 9 is a graph illustrating Green Strength 25% Modulus versus PEDM Ethylene Content in accordance with various embodiments of the present disclosure.

FIG. 8 is a graph illustrating Tel-Tak Peak Force versus PEDM ethylene content. As shown in FIG. 8, Tel-Tak Peak Force is higher for each composition having PEDM A, PEDM B, and PEDM C, as compared to comparative Composition C1. FIG. 9 is a graph illustrating Green Strength 25% Modulus versus PEDM Ethylene Content. As shown in FIG. 9, compositions having PEDM A and PEDM B have a lower Green Strength 25% Modulus than comparative Composition C1. It is expected that an increase in tack normally occurs with a corresponding reduction in green strength, which is what was observed for compositions having PEDM A and PEDM B. However, for the composition having PEDM A (35 wt % ethylene content), both tack and green strength are simultaneously higher in relation to the composition that does not contain PEDM component (Composition C1).

Composition Rheology: Small Angle Oscillatory Shear:

Small Angle Oscillatory Shear (SAOS) measurements were carried out using the ATD® 1000 Rubber Process Analyzer from Alpha Technologies. A sample of approximately 4.5 gm weight is mounted between the parallel plates of the ATD® 1000. The test temperature is 66° C., the applied strain is 6.95%, and the frequency was varied from 0.21 rad/s to 210 rad/s. The elastic modulus (G') and the phase angle (δ) are measured at each frequency.

Figure 10A:
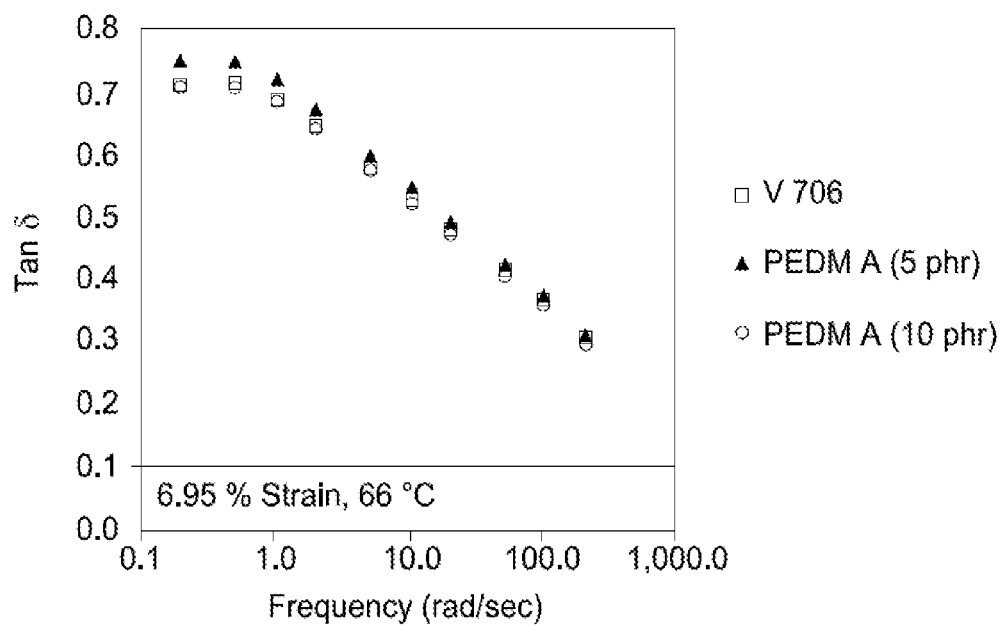
FIG. 10A is a graph illustrating phase angle (tan δ) versus frequency for compositions comprising PEDM A at both 5 phr and 10 phr in accordance with various embodiments of the present disclosure.
Figure 10B:
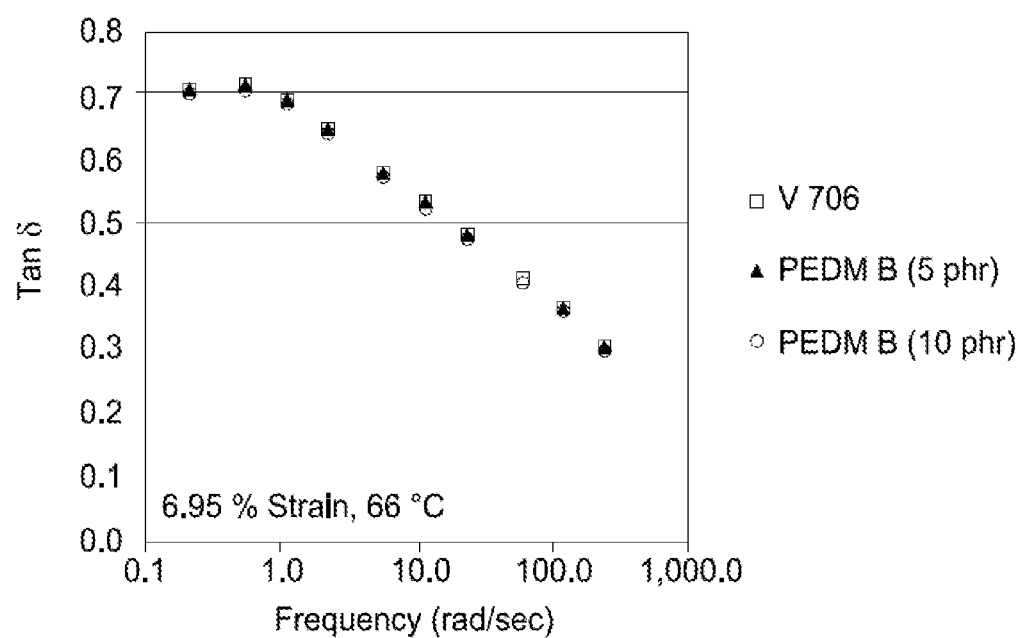
FIG. 10B is a graph illustrating phase angle (tan δ) versus frequency for compositions comprising PEDM B at both 5 phr and 10 phr in accordance with various embodiments of the present disclosure.
Figure 10C:
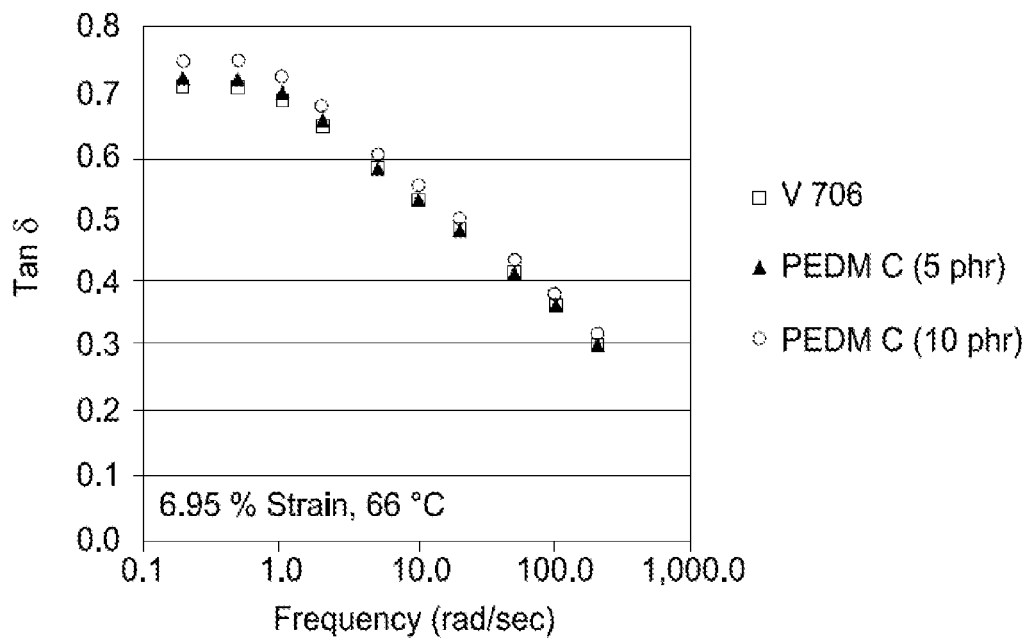
FIG. 10C is a graph illustrating phase angle (tan δ) versus frequency for compositions comprising PEDM C at both 5 phr and 10 phr in accordance with various embodiments of the present disclosure.

FIG. 10A, FIG. 10B, and FIG. 10C are graphs illustrating the tangent of the phase angle (tan δ) versus frequency for compositions comprising PEDM A, PEDM B, and PEDM C, respectively, at both 5 phr and 10 phr. As shown in FIG. 10A, FIG. 10B, and FIG. 10C, the dynamic properties of the compositions can be inferred from the tan δ response across a range of frequencies. The tan δ response of the reference Vistalon™ 706 composition (C1) is shown in each of FIG. 10A, FIG. 10B, and FIG. 10C for comparison. The tan δ curve of the reference composition (C1) is matched with PEDM A at 10 phr (FIG. 10A), PEDM B at 5 phr (FIG. 10B) and PEDM C at 5 phr (FIG. 10B), respectively.

Figure 11A:
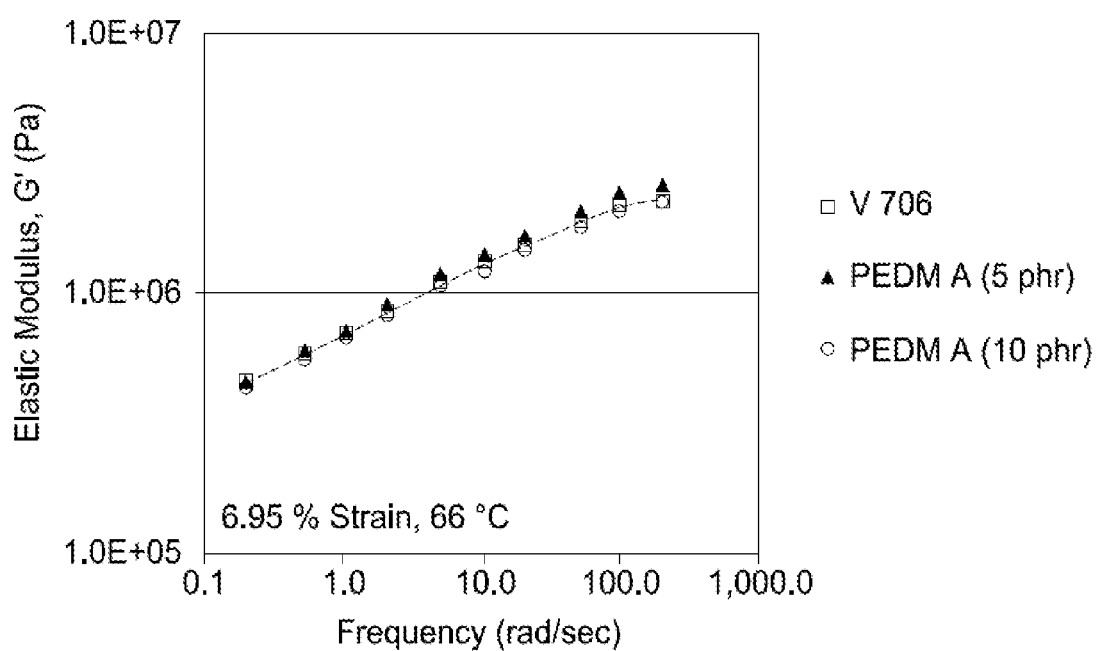
FIG. 11A is a graph illustrating Elastic Modulus (G') versus frequency for compositions comprising PEDM A at both 5 phr and 10 phr in accordance with various embodiments of the present disclosure.
Figure 11B:
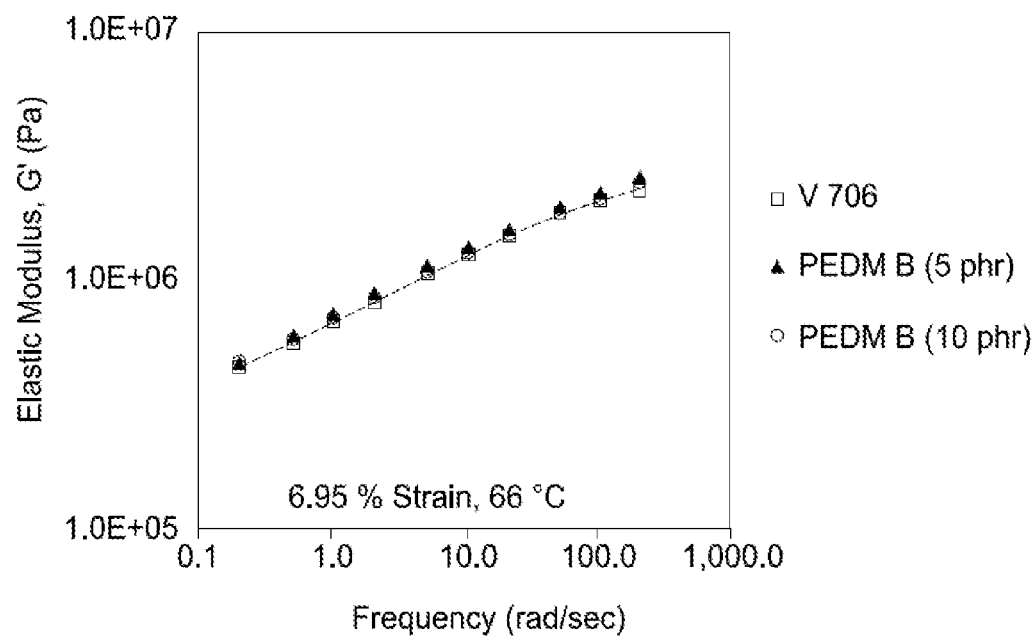
FIG. 11B is a graph illustrating Elastic Modulus (G') versus frequency for compositions comprising PEDM B at both 5 phr and 10 phr in accordance with various embodiments of the present disclosure.
Figure 11C:
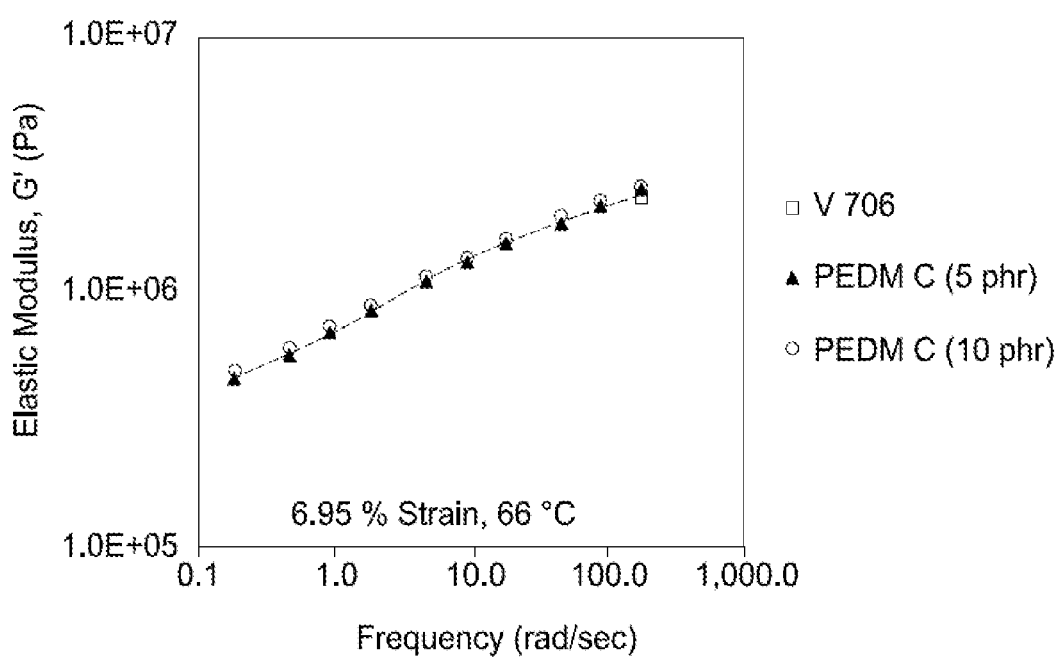
FIG. 11C is a graph illustrating Elastic Modulus (G') versus frequency for compositions comprising PEDM C at both 5 phr and 10 phr in accordance with various embodiments of the present disclosure.

FIG. 11A, FIG. 11B, and FIG. 11C are graphs illustrating Elastic Modulus (G') versus frequency for compositions comprising PEDM A, PEDM B, and PEDM C, respectively, at both 5 phr and 10 phr. As shown in FIG. 11A, FIG. 11B and FIG. 11C, the elastic modulus of the reference Vistalon™ 706 composition (C1) is shown for comparison. In some cases, at low frequency (0.207 rad/s), the elastic modulus of the compositions containing PEDM are marginally lower compared to the reference (C1) composition. The correlation of tack to elastic modulus is described in the paper by G. R. Hamed, *Rubber Chem. And Tech.*, 54, 578 (1981), where lower elastic modulus at low frequency is associated with higher tack properties.

Elastomeric formulation based on Vistalon™ 706 and PEDM C:

A composition having 20 phr PEDM C and 80 phr Vistalon™ 706 was also formed. Elastomeric formulations containing EP(D)M polymer (Vistalon™ 706), carbon black, oil, and curatives were mixed in a 4300 cc Farrel OOC Banbury® Mixer. Table 5 illustrates the representative EP(D)M formulation. A conventional mix was adopted for compounding using a fill factor of 70%. At the start of the mix, polymer, black and additives were introduced with the rotor speed at 50 rpm. The ram was raised three times during the mixing cycle to complete 3 sweeps to ensure no material remained on top of the ram. Mixing of the 1st pass or master batch continued until the temperature reached 300° F. (~148.9° C.) and the batch was discharged. In the final pass or 2nd pass, the master batch, curatives and retarder were added up front at time 0 with mixer speed at 50 rpm. The ram was raised 2 times in order to perform 2 sweeps to inspect any material remaining on the ram. Each batch was discharged around 210° F. (~98.9° C.). The probed temperature of the rubber was approximately 250° F. (~121.1° C.).

TABLE 5

| Component | Density | C8 Vistalon™ 706 Phr | 9 Vistalon™ 706:PEDM C (80 phr: 20 phr) phr |
|---|---|---|---|
| First Pass | | | |
| Vistalon™ 706 | 0.86 | 100 | 80 |
| PEDM C | 0.86 | — | 20 |
| N330 Carbon Black | 1.80 | 60 | 60 |
| Paraffinic Oil (Sunpar 2280) | 0.89 | 10 | 10 |
| Zinc Oxide | 5.61 | 5.0 | 5.0 |
| Zinc Stearate | 1.10 | 1.0 | 1.0 |
| Agerite Resin D | 1.06 | 1.0 | 1.0 |
| Dymalink 708 | 1.49 | 15 | 15 |
| Mill addition (entire batch) | | | |
| Vulcup 40 KE | 1.50 | 5.0 | 5.0 |
| Dymalink 719 | 1.03 | 0.3 | 0.3 |
| Specific Gravity | | 1.11 | 1.11 |
| Total phr Master Batch | | 192.0 | 192.0 |
| Total phr | | 197.3 | 197.3 |
| Batch Factor (Final) | | 16.6 | 16.6 |
| Batch Wt. (Final) | | 3284 | 3284 |
| Fill Factor (%) (Final) | | 69 | 69 |
| Mixer Volume (cc) | | 4300 | 4300 |
| 1st Pass Masterbatch 50 rpm | | | |
| 0-Add polymer, black, oil, etc. | | | |
| Sweep @ 140° F. | | | |
| Sweep @ 200° F. | | | |
| Sweep @ 240° F. | | | |
| Ram Pressure 60 psi | | | |
| Dump Temperature (° F.) | | | 300 |
| Dump Weight (gm) | | | 3284 |
| 2nd Pass Final 50 rpm | | | |
| 0-Add masterbatch, curative and retarder | | | |
| Sweep @ 180° F. | | | |
| Sweep @ 200° F. | | | |
| Ram Pressure 60 psi | | | |
| Dump Temperature (° F.) | | | 210 |
| Dump Weight (gm) | | | 3284 |

Figure 14:
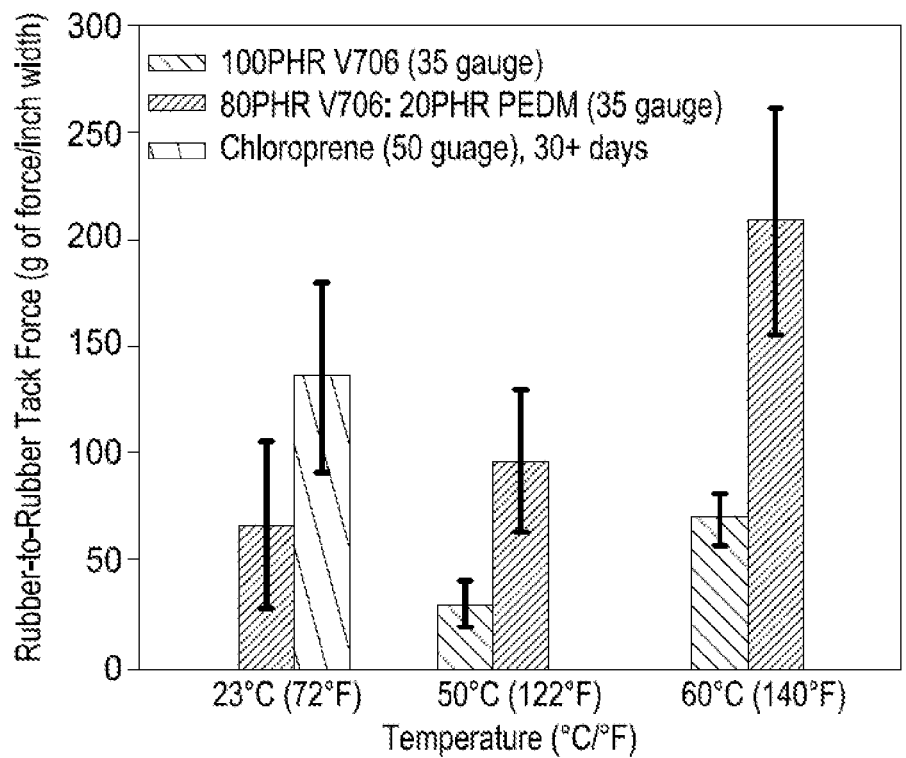
FIG. 14 is a graph illustrating rubber-to-rubber tack force versus temperature in accordance with various embodiments of the present disclosure.
Figure 15:
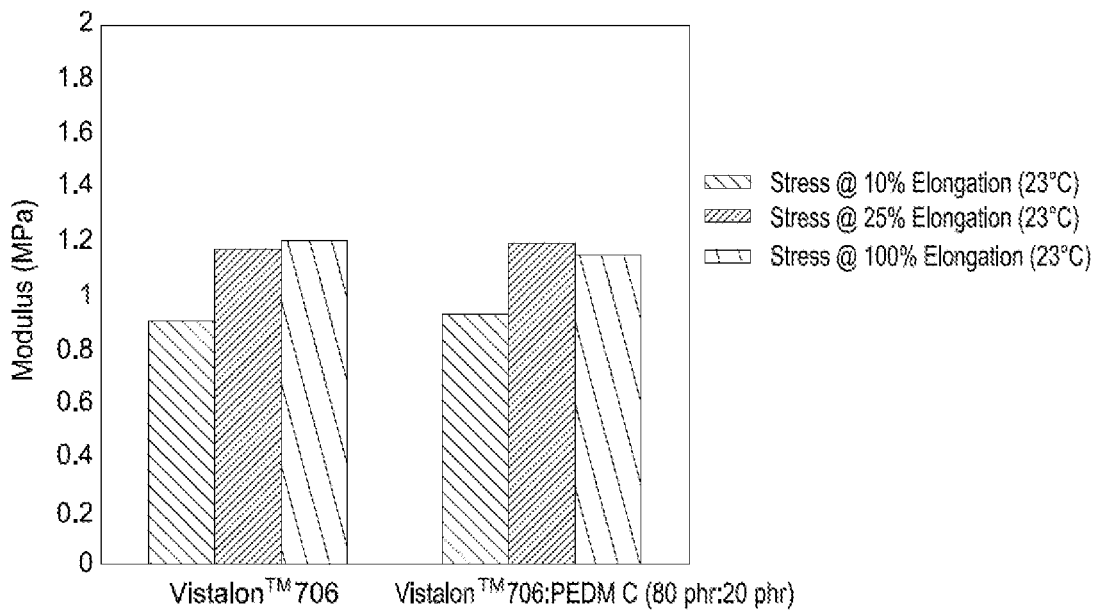
FIG. 15 is a graph illustrating Modulus (MPa) of compositions in accordance with various embodiments of the present disclosure.

Compound Properties of formulations based on Vistalon™ 706 and PEDM C:

There is a need for improving building tack of EP(D)M compounds without adding tackifying resins, specifically in the room temperature and feasible manufacturing temperature ranges. In at least one aspect, a composition of the present disclosure has higher rubber-to-rubber tack at room temperature as compared to the Vistalon™ 706 Control by inclusion of PEDM C within the composition. Polychloroprene and natural rubber systems are known to have room temperature tack. FIG. 14 is a graph illustrating rubber-to-rubber tack force versus temperature according to one embodiment of the present disclosure. As shown in FIG. 14, the Vistalon™ 706 control composition has a lack of tack at room temperature. The Vistalon™ 706:PEDM C (80 phr:20 phr) sample yielded average rubber-to-rubber tack of 67 g of force/inch width at room temperature (23° C. (72° F.)). The tack of the Vistalon™ 706:PEDM C (80 phr:20 phr) composition increases significantly from 23° C. to 60° C. as compared to the Vistalon™ 706 control. The rubber-to-rubber tack testing was carried out based on Modified ASTM D3330 Method F. In particular, the following modifications to the ASTM method were utilized: (1) instead of a 2μ finish stainless steel substrate per the ASTM method, an uncured rubber sheeting substrate was used; (2) for conditioning, instead of the 24 hours at 23° C. in the ASTM method, the sample was conditioned for 1 minute at the test temperature; and (3) test temperature was within the range from 40° C. to 60° C. instead of 23° C. per the ASTM method. This method provides the benefit of a larger test area and longer dwell time, thus providing more extensive testing of the sample versus the Tel-Tak method. FIG. 15 is a graph illustrating Modulus (MPa) of the inventive compositions. FIG. 15 illustrates the corresponding green strength (Tensile Stress at 10%, 25% and 100% extension) properties of the formulations shown in Table 5. As stated above, it is expected that the increase in tack normally occurs with a marginal reduction in green strength. However, the green strength of the Vistalon™ 706:PEDM C (80 phr:20 phr) composition is not reduced by the presence of 20 phr PEDM C.

Figure 16:
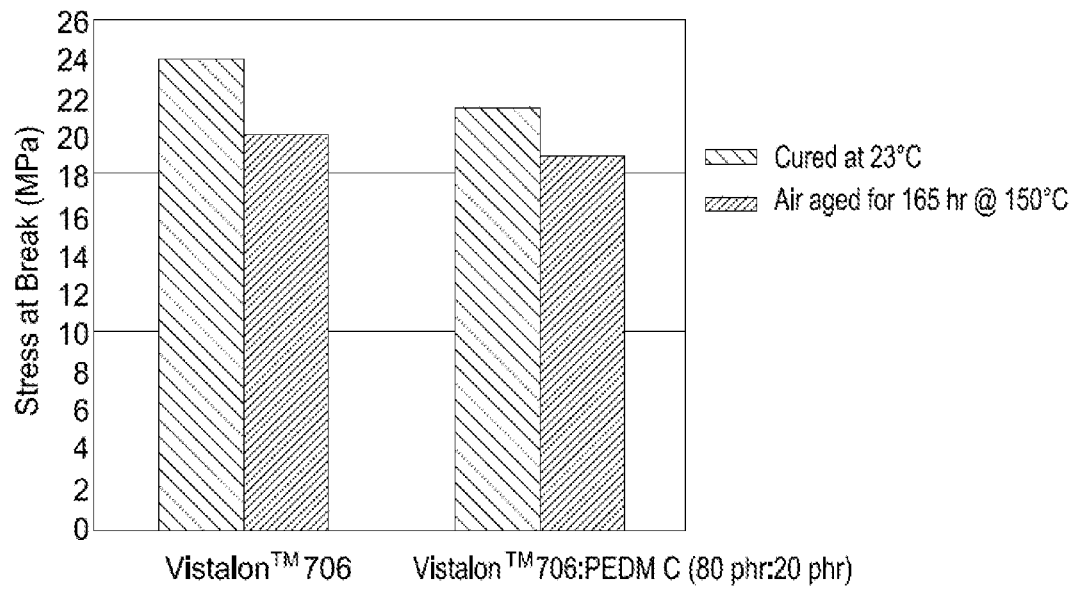
FIG. 16 is a graph illustrating stress at break (MPa) of compositions in accordance with various embodiments of the present disclosure.
Figure 17:
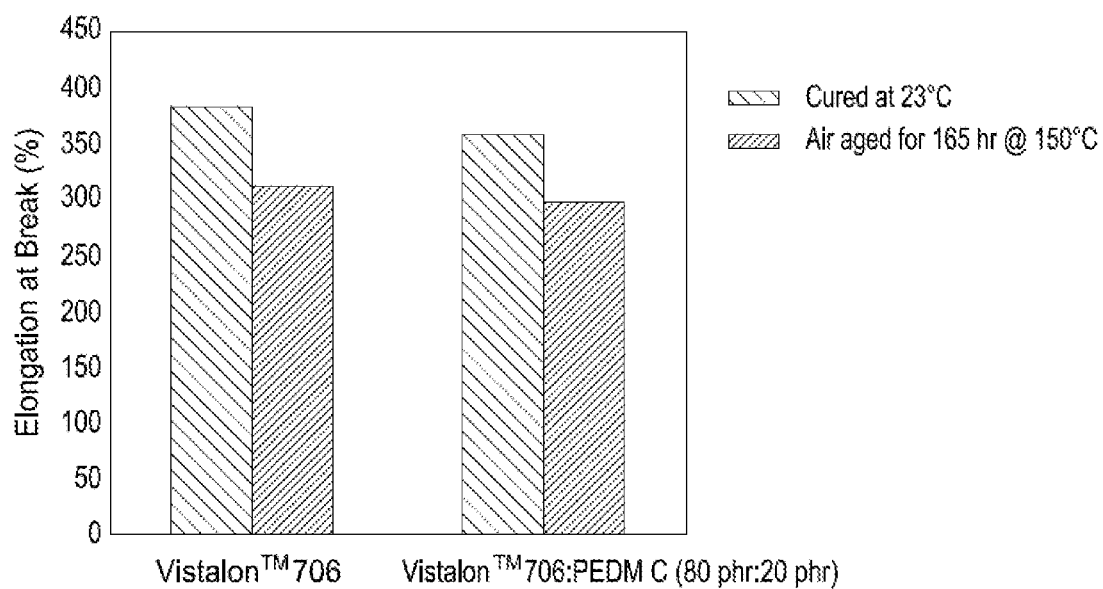
FIG. 17 is a graph illustrating elongation at break (%) of compositions in accordance with various embodiments of the present disclosure.

Table 6 shows the compound properties for the Control formulation with only Vistalon™ 706 and the inventive formulation with PEDM C of 20 phr concentration. The aged tensile strength and elongation for 7 days at 150° C. of the cured formulations in the Vistalon™ 706:PEDM C (80 phr:20 phr) composition exhibited a lesser impact compared to 100 phr Vistalon™ 706 composition as shown in FIG. 16 and FIG. 17, respectively.

TABLE 6

| Example | | C8 | 9 |
|---|---|---|---|
| Vistalon ™ 706 | | 100 | 80 |
| PEDM C | | | 20 |
| Compound Viscosity ML (1 + 4) 100° C. | MU | 74 | 64 |
| Mooney Scorch at 125° C. | | | |
| Min Viscosity | MU | 39 | 33 |
| t1 | min | 14.8 | 15.6 |
| t5 | min | 39.7 | 51.9 |
| MDR 180° C., 0.5 deg | | | |
| ts2 | min | 0.46 | 0.49 |
| t50 | min | 1.22 | 1.29 |
| t90 | min | 4.08 | 4.35 |
| Peak Rate | dN.m/min | 24.81 | 20.82 |
| MH-ML | dN.m | 29.49 | 26.42 |

TABLE 6-continued

| Example | | C8 | 9 |
|---|---|---|---|
| Press Cure, 15 min at 180° C. | | | |
| 100% Modulus | MPa | 4.5 | 4.5 |
| 200% Modulus | MPa | 11.2 | 11.2 |
| 300% Modulus | MPa | 19.0 | 18.6 |
| Stress @ Break | MPa | 23.9 | 21.6 |
| Strain @ Break | % | 382 | 357 |
| Oven Aged, 7 days at 150° C. | | | |
| 100% Modulus | MPa | 5.8 | 5.9 |
| 200% Modulus | MPa | 13.2 | 13.1 |
| 300% Modulus | MPa | 19.8 | 14.0 |
| Stress @ Break | MPa | 20.0 | 19.1 |
| Strain @ Break | % | 310 | 294 |
| Compound Green Strength | | | |
| 10% Modulus | MPa | 0.92 | 0.93 |
| 25% Modulus | MPa | 1.19 | 1.19 |
| 100% Modulus | MPa | 1.20 | 1.15 |

Figure 12:
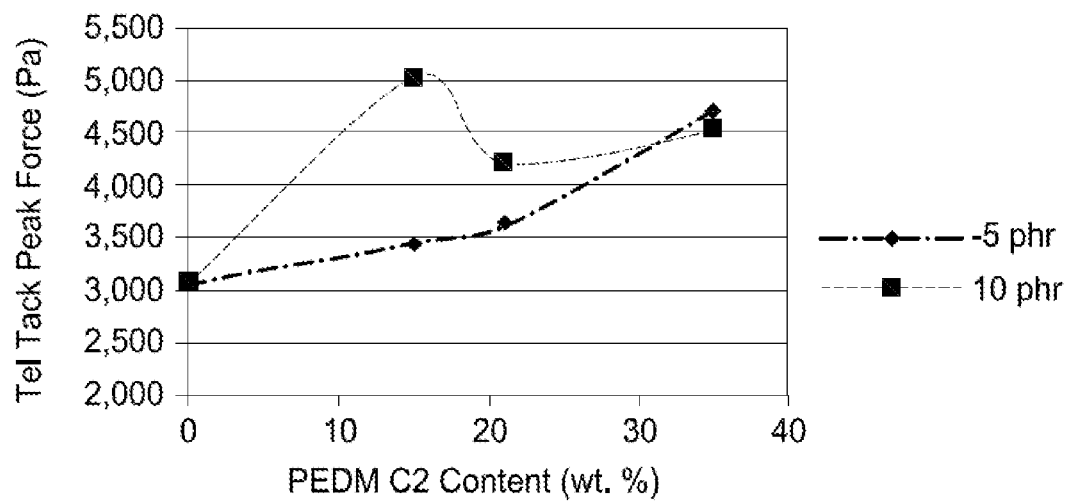
FIG. 12 is a graph illustrating Tel-Tak Peak Force versus PEDM ethylene content in accordance with various embodiments of the present disclosure.

Compound Properties of Formulations based on Vistalon™ 9301:

FIG. 12 is a graph illustrating Tel-Tak Peak Force versus PEDM ethylene content according to one embodiment of the present disclosure. As shown in FIG. 12, composition tack is dependent on the PEDM ethylene content for formulations that contain PEDM polymers at 5 phr and 10 phr levels respectively. The tack is higher in all formulations compared to the reference compound containing Vistalon™ 9301 without the PEDM. The tack increases from 3.3 kPa to 5.0 kPA for formulation containing 15 wt % ethylene PEDM at 10 phr level.

Figure 13:
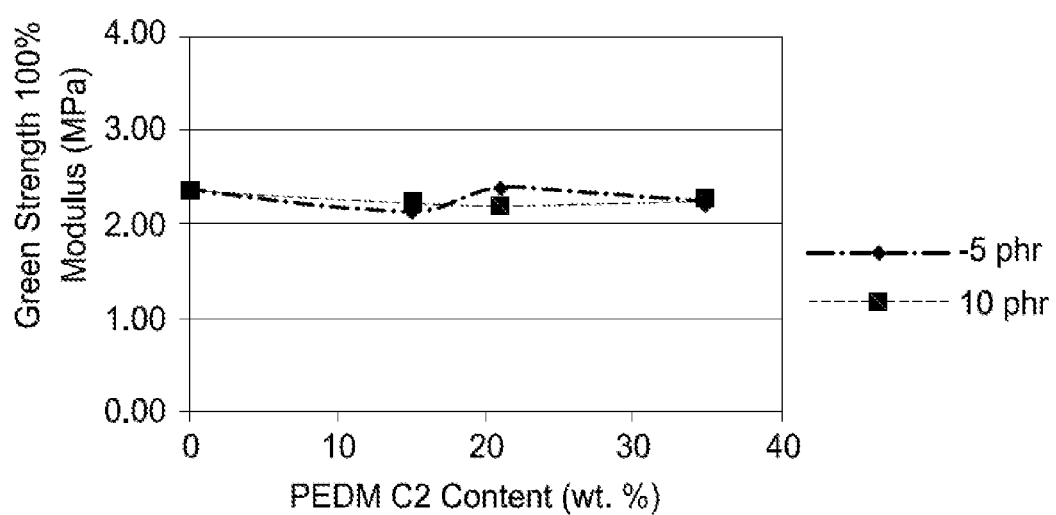
FIG. 13 is a graph illustrating Green Strength 100% Modulus versus PEDM Ethylene Content in accordance with various embodiments of the present disclosure.

FIG. 13 is a graph illustrating Green Strength 100% Modulus versus PEDM Ethylene Content according to one embodiment of the present disclosure. It is expected that the increase in tack normally occurs with a marginal reduction in green strength, which is indeed the case for the formulations containing the PEDM polymers.

Table 7 shows the compound properties for the reference formulation Example C2 and the inventive formulations of Examples 8 through 14 respectively formulated with PEDM of varying ethylene content and phr levels in the compound. The tensile strength and elongation of the cured formulations in the inventive examples are higher compared to control formulation C2.

TABLE 7

| Example | | C2 | 8 | 9 | 10 | 11 | 12 | 13 | 14 |
|---|---|---|---|---|---|---|---|---|---|
| Vistalon ™ 9301 | | 100 | 100 | 95 | 90 | 95 | 90 | 95 | 90 |
| PEDM A | | | | 5 | 10 | | | | |
| PEDM B | | | | | | 5 | 10 | | |
| PEDM C | | | | | | | | 5 | 10 |
| Compound Viscosity ML (1 + 4) 100° C. Mooney Scorch at 125° C. | MU | 121 | 136 | 121 | 126 | 125 | 122 | 121 | 122 |
| MM Viscosity | MU | 49 | 51 | 45 | 47 | 47 | 45 | 45 | 45 |
| t1 | mm | 18.8 | 17.8 | 18.3 | 19.8 | 18.3 | 22.3 | 21.3 | 22.3 |
| t5 | mm | 44.3 | 44.8 | 43.3 | 43.3 | 42.8 | 49.0 | 50.0 | 50.3 |
| ODR 180° C. +/− 3 deg. Arc 6 min | | | | | | | | | |
| ML | dN · m | 22.9 | 24.2 | 20.2 | 21.9 | 21.2 | 21.1 | 21.2 | 21.0 |
| MH | dN · m | 173.8 | 177.9 | 162.4 | 164.7 | 169.4 | 155.9 | 157.8 | 154.3 |
| ts2 | mm | 0.8 | | 0.8 | | 0.9 | | 1.0 | 0.9 |
| t25 | mm | 1.3 | 0.8 | 1.3 | 0.8 | 1.4 | 0.8 | 1.5 | 1.4 |
| t50 | mm | 1.8 | 1.3 | 1.9 | 1.3 | 2.0 | 1.3 | 2.0 | 2.0 |
| t90 | mm | 4.1 | 1.8 | 4.1 | 1.8 | 4.2 | 1.9 | 4.3 | 4.1 |

TABLE 7-continued

| Example | | C2 | 8 | 9 | 10 | 11 | 12 | 13 | 14 |
|---|---|---|---|---|---|---|---|---|---|
| Peak Rate | dN · m/ | 108.4 | 4.0 | 99.5 | 4.0 | 104.8 | 4.1 | 96.2 | 92.1 |
| | mm | 151.0 | 114.9 | 142.2 | 93.0 | 148.3 | 90.9 | 136.7 | 133.2 |
| MH-ML | dN · m | | 153.9 | | 142.8 | | 134.7 | | |
| Press Cure, 15 min at 180° C. | | | | | | | | | |
| Hardness | Shore | | | | | | | | |
| 100% Modulus | A | 8.3 | 8.7 | 7.3 | 7.4 | 8.4 | 6.8 | 7.0 | 7.7 |
| 300% Modulus | MPa | | None | None | None | None | None | None | None |
| Stress @ Break | MPa | 26.6 | | 25.8 | | 28.7 | | 24.1 | 26.1 |
| Strain @ Break | MPa | 241 | 29.8 | 263 | 26.7 | 262 | 25.8 | 245 | 251 |
| Tear Die C (Avg. Peak Value) | % | 46.4 | 257 | 45.0 | 261 | 45.0 | 273 | 46.9 | 44.6 |
| Tel Tak test | N/mm | | 45.8 | | 46.1 | | 46.6 | | |
| Peak force Compound Green Strength | Pa | 3056 | 2969 | 4701 | 4531 | 3623 | 4224 | 3448 | 5027 |
| 100% Modulus | MPa | 2.4 | 2.5 | 2.2 | 2.3 | 2.4 | 2.2 | 2.1 | 2.2 |
| 300% Modulus | MPa | 4.5 | 4.6 | 4.1 | 4.2 | 4.4 | 3.9 | 3.9 | 4.2 |
| Stress @ Break | MPa | 6.2 | 6.7 | 5.7 | 7.2 | 8.0 | 6.9 | 5.7 | 8.4 |
| Strain @ Break | % | 412 | 448 | 411 | 508 | 512 | 488 | 428 | 518 |

Overall, compositions of the present disclosure comprise from 5 phr to 30 phr of a PEDM terpolymer having from 1 to 10 wt % diene, 15 to 40 wt % ethylene, and 13 to 85 wt % propylene, said wt % based on the weight of the PEDM terpolymer; and from 70 phr to 95 phr of an ethylene-based copolymer comprising an ethylene content different than the first polymer (based on the weight of the ethylene-based copolymer), a $C_3$ to $C_{12}$ α-olefin, and, optionally, one or more dienes. Compositions of the present disclosure can have a green strength 25% modulus of about 1.7 MPa or greater. Compositions of the present disclosure can have a tensile strength at break of 21.4 MPa or greater. Compositions of the present disclosure can have a tack of at least about 3.4 kPa, such as at least about 5.5 kPa. Transmission belts of the present disclosure comprise one or more compositions of the present disclosure having one or more advantageous properties described herein to provide new and improved transmission belts and new and improved formation of transmission belts.

All documents described herein are incorporated by reference herein, including any priority documents and/or testing procedures to the extent they are not inconsistent with this text. As is apparent from the foregoing general description and the specific embodiments, while some embodiments have been illustrated and described, various modifications can be made without departing from the spirit and scope of the disclosure. Accordingly, it is not intended that the disclosure be limited thereby. Likewise, the term "comprising" is considered synonymous with the term "including." Likewise whenever a composition, an element or a group of elements is preceded with the transitional phrase "comprising", it is understood that we also contemplate the same composition or group of elements with transitional phrases "consisting essentially of," "consisting of", "selected from the group of consisting of," or "is" preceding the recitation of the composition, element, or elements and vice versa.

We claim:

1. A composition comprising:
    from 5 to 30 parts by weight per hundred parts by weight rubber (phr) of a propylene-α-olefin-diene (PEDM) terpolymer comprising 1 to 10 wt % diene, 13 to 40 wt % α-olefin, and 15 to 85 wt % propylene, said wt % based on the weight of the PEDM terpolymer; and
    from 70 to 95 phr of an ethylene-based copolymer comprising ethylene, one or more $C_3$ to $C_{12}$ α-olefins, and, optionally, one or more dienes; wherein the amount of ethylene content of the ethylene-based copolymer (in wt % on the basis of total weight of the ethylene-based copolymer) is different from the amount of α-olefin content of the PEDM terpolymer (in wt % on the basis of total weight of the PEDM terpolymer).

2. The composition of claim 1, wherein the PEDM is formed by polymerizing propylene, one or more α-olefins, and one or more dienes in the presence of a bridged fluorenyl-cyclopentadienyl group 4 catalyst that has been activated by an activator;
    wherein the catalyst is represented by Formula (I):

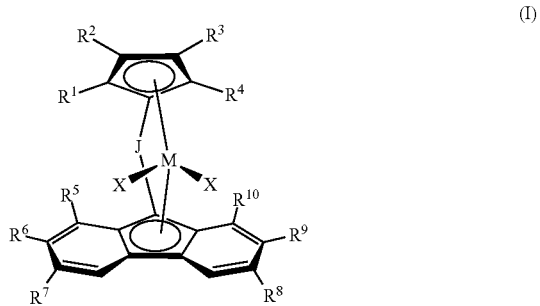

wherein J is a divalent bridging group;
M is a group 4 transition metal;
each X is independently a univalent anionic ligand, or two Xs are joined together to form a metallocycle ring with M, or two Xs are joined to form a chelating ligand, a diene ligand, or an alkylidene ligand;
each $R^1$, $R^2$, $R^3$, $R^4$, $R^5$, $R^6$, $R^7$, $R^8$, $R^9$, and $R^{10}$ is independently hydrogen, $C_1$ to $C_{50}$ substituted or unsubstituted alkyl, provided that any one or more of the pairs $R^1$ and $R^2$, $R^3$ and $R^4$, $R^5$ and $R^6$, $R^6$ and $R^7$, $R^8$ and $R^9$, and $R^9$ and $R^{10}$, may optionally be bonded together to form a saturated or partially saturated cyclic or fused ring structure; and the activator is a non-coordinating anion activator.

3. The composition of claim 2, wherein the bridged fluorenyl-cyclopentadienyl group 4 catalyst is 1,1'-bis(4-triethylsilylphenyl)methylene(cyclopentadienyl)(2,7-di-tertiary-butyl-fluoren-9-yl)hafnium dimethyl.

4. The composition of claim 2, wherein the activator is N,N-dimethylanilinium tetrakis(pentafluorophenyl)borate.

5. The composition of claim 1, wherein the PEDM terpolymer has a $H_f$ less than 1 J/g.

6. The composition of claim 1, wherein the PEDM terpolymer has a crystallinity of from 0.1% to 5%, as determined by differential scanning calorimetry.

7. The composition of claim 1, wherein the PEDM terpolymer has atactic propylene sequences.

8. The composition of claim 1, wherein the PEDM terpolymer has an α-olefin that is ethylene and an ethylene content from 30 wt % to 40 wt %.

9. The composition of claim 1, wherein the diene of the PEDM terpolymer is one or more of 5-ethylidene-2-norbornene, dicyclopentadiene, 5-vinyl-2-norbornene, 1,4-hexadiene, alkyldicyclopentadiene, 1,4-pentadiene, 1,5-hexadiene, 1,4-heptadiene, 2-methyl-1,5-hexadiene, cyclooctadiene, 1,4-octadiene, 1,7-octadiene, 5-n-propylidene-2-norbornene, 5-(2-methyl-2-butenyl)-2-norborene, and norbornadiene.

10. The composition of claim 9, wherein the diene of the PEDM terpolymer is 5-ethylidene-2-norbornene.

11. The composition of claim 1, wherein the PEDM terpolymer has a diene content from 2 wt % to 4 wt %.

12. The composition of claim 1, wherein the ethylene-based copolymer comprises 40 to 95 wt % ethylene, 0 to 10 wt % of one or more dienes, and a $C_3$ to $C_{12}$ α-olefin, said wt % s based on the total weight of the ethylene-based copolymer.

13. The composition of claim 1, wherein the $C_3$ to $C_{12}$ α-olefin of the ethylene-based copolymer is propylene or 1-butene.

14. The composition of claim 1, wherein the $C_3$ to $C_{12}$ α-olefin of the ethylene-based copolymer is propylene.

15. An at least partially cross-linked elastomeric composition that is the reaction product of:
a composition according to claim 1;
one or more vulcanization activators; and
one or more vulcanizing agents.

16. The composition of claim 15, further comprising one or more additives comprising at least one of carbon black and/or process oil.

17. The composition of claim 16, wherein the composition comprises from 1 phr to 150 phr of a paraffinic process oil, the paraffinic process oil having a viscosity at 40° C. within the range from 80 to 600 CSt.

18. The composition of claim 16, further comprising a mineral filler.

19. The composition of claim 15, wherein the composition has a tack of about 4,000 Pa or greater and a green strength 25% modulus of about 1.7 MPa or greater.

20. The composition of claim 15, wherein the composition has a tensile strength at break of 21.4 MPa or greater.

21. The composition of claim 15, wherein the composition has a tack of at least about 3.4 kPa.

22. The composition of claim 21, wherein the composition has a tack of at least about 5.5 kPa.

23. A transmission belt, comprising:
a composition according to claim 1.

24. The transmission belt of claim 23, further comprising at least one of a filler, a plasticizer, or a stabilizer.

* * * * *